United States Patent
Zhao et al.

(10) Patent No.: US 12,397,656 B2
(45) Date of Patent: Aug. 26, 2025

(54) METHODS AND SYSTEMS FOR CONTROLLING ELECTRIC MOTOR TORQUE IN A BATTERY ELECTRIC VEHICLE

(71) Applicant: Ford Global Technologies, LLC, Dearborn, MI (US)

(72) Inventors: Yanan Zhao, Ann Arbor, MI (US); Ming Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 17/934,120

(22) Filed: Sep. 21, 2022

(65) Prior Publication Data
US 2024/0092185 A1    Mar. 21, 2024

(51) Int. Cl.
*B60L 15/20*    (2006.01)
*B60K 1/02*    (2006.01)

(52) U.S. Cl.
CPC ............ *B60L 15/2036* (2013.01); *B60K 1/02* (2013.01); *B60L 2240/22* (2013.01); *B60L 2240/423* (2013.01)

(58) Field of Classification Search
CPC ............ B60L 15/20; B60L 15/36; B60K 1/02
See application file for complete search history.

(56) References Cited

U.S. PATENT DOCUMENTS

| | | | |
|---|---|---|---|
| 6,704,627 B2 * | 3/2004 | Tatara | B60K 6/48 903/917 |
| 8,738,266 B2 * | 5/2014 | Kruse | B60L 15/20 701/84 |
| 9,014,898 B2 * | 4/2015 | Saito | B60L 5/08 701/22 |
| 9,096,226 B2 | 8/2015 | Yu et al. | |
| 10,363,918 B2 | 7/2019 | Kim et al. | |
| 11,312,354 B2 * | 4/2022 | Honkomp | B60L 15/20 |
| 11,560,130 B2 * | 1/2023 | Westerhof | B60W 10/02 |
| 2009/0054202 A1 * | 2/2009 | Yamakado | B60K 6/52 477/6 |
| 2009/0118080 A1 * | 5/2009 | Heap | B60K 6/26 477/3 |
| 2013/0144476 A1 * | 6/2013 | Pinto | B60L 50/00 903/930 |
| 2014/0343770 A1 * | 11/2014 | Sponheimer | B60L 15/2036 701/22 |
| 2022/0227354 A1 * | 7/2022 | Hagiwara | B60T 8/1755 |
| 2022/0396312 A1 * | 12/2022 | Flumeri | B60L 3/106 |

* cited by examiner

*Primary Examiner* — Dino Kujundzic
(74) *Attorney, Agent, or Firm* — David Kelley; McCoy Russell LLP

(57) ABSTRACT

Methods and systems for a vehicle are provided. A method for a vehicle includes coupling two motors to an axle. Furthermore, the method includes, at each of the two motors, setting a requested motor torque to a permitted motor torque in compliance with a threshold motor power, determining an unmet motor torque as a difference between the requested and the permitted motor torque, and balancing the unmet motor torque, including reducing the permitted motor torque at one or both of the two motors.

20 Claims, 7 Drawing Sheets

METHODS AND SYSTEMS FOR CONTROLLING ELECTRIC MOTOR TORQUE IN A BATTERY ELECTRIC VEHICLE

FIELD

The present description relates generally to methods and systems for controlling electric motor torque in an electric vehicle.

BACKGROUND/SUMMARY

Electric vehicles, including battery electric vehicles (BEVs), may be equipped with multiple independent electric machines such as electric motors for propelling the vehicle. For example, one or more electric motors may positioned at each axle of the vehicle for providing propulsive power to the vehicle wheels. In the case of a 3-motor BEV, two electric motors may be positioned at one axle and a single electric motor may be positioned at the other axle. In the case of a 4-motor BEV, two electric motors are positioned at each axle, with an electric motor positioned proximally and driving propulsion at each wheel of the BEV. To provide control flexibility for torque vectoring, vehicle lateral control, off-road feature controls, and the like, the electric motors may be controlled independently, whereby each electric motor may be operated at a different motor torque, motor power, and/or motor speed during vehicle operation. In particular, when two electric motors are positioned at the same axle, the torque requested from both electric motors may be controlled to provide propulsion (or braking) at both wheels, and a desired yaw moment at the axle. However, during certain vehicle operating conditions, the power allocated from the vehicle battery to one or more electric motors may be insufficient for achieving a torque requested thereat. Furthermore, adjusting the requested torque at the electric motors to comply with the battery power allocation can introduce an unintended yaw moment at the axle, thereby reducing vehicle drivability.

In one example, the issues described above may be at least partially addressed by a method for operating a vehicle, including coupling two motors to an axle, and, at each of the two motors, setting a requested motor torque to a permitted motor torque in compliance with a threshold motor power, determining an unmet motor torque as a difference between the requested and the permitted motor torque, and balancing the unmet motor torque, including reducing the permitted motor torque at one or both of the two motors. Balancing the unmet motor torque may include reducing the permitted motor torque at one or both of the two motors whereby the unmet motor torque at each of the two motors is equal. The method may further include partially balancing the unmet motor torque, including reducing the permitted motor torque at one or both of the two motors whereby a difference between the unmet motor torques at each of the two motors is reduced.

In this way a technical effect of balancing the torque at the two motors to maintain the intended yaw moment or to reduce a deviation from the intended yaw moment can be achieved, while complying with the battery power allocated to the two motors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
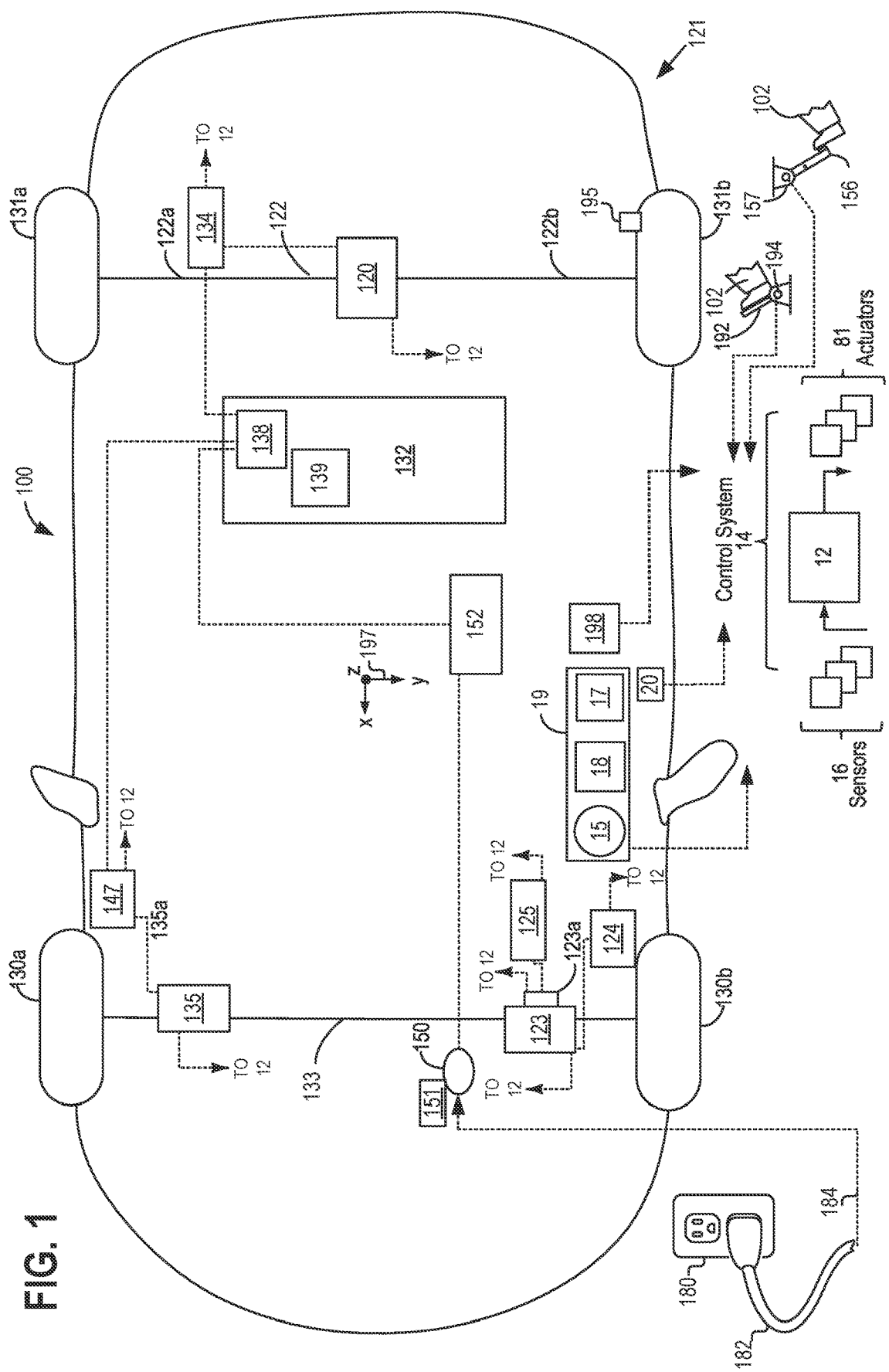
FIGS. 1 and 2 are example schematic diagrams of a vehicle system, including a driveline and a plurality of electric machines coupled to the driveline for propelling the vehicle system.
Figure 2:
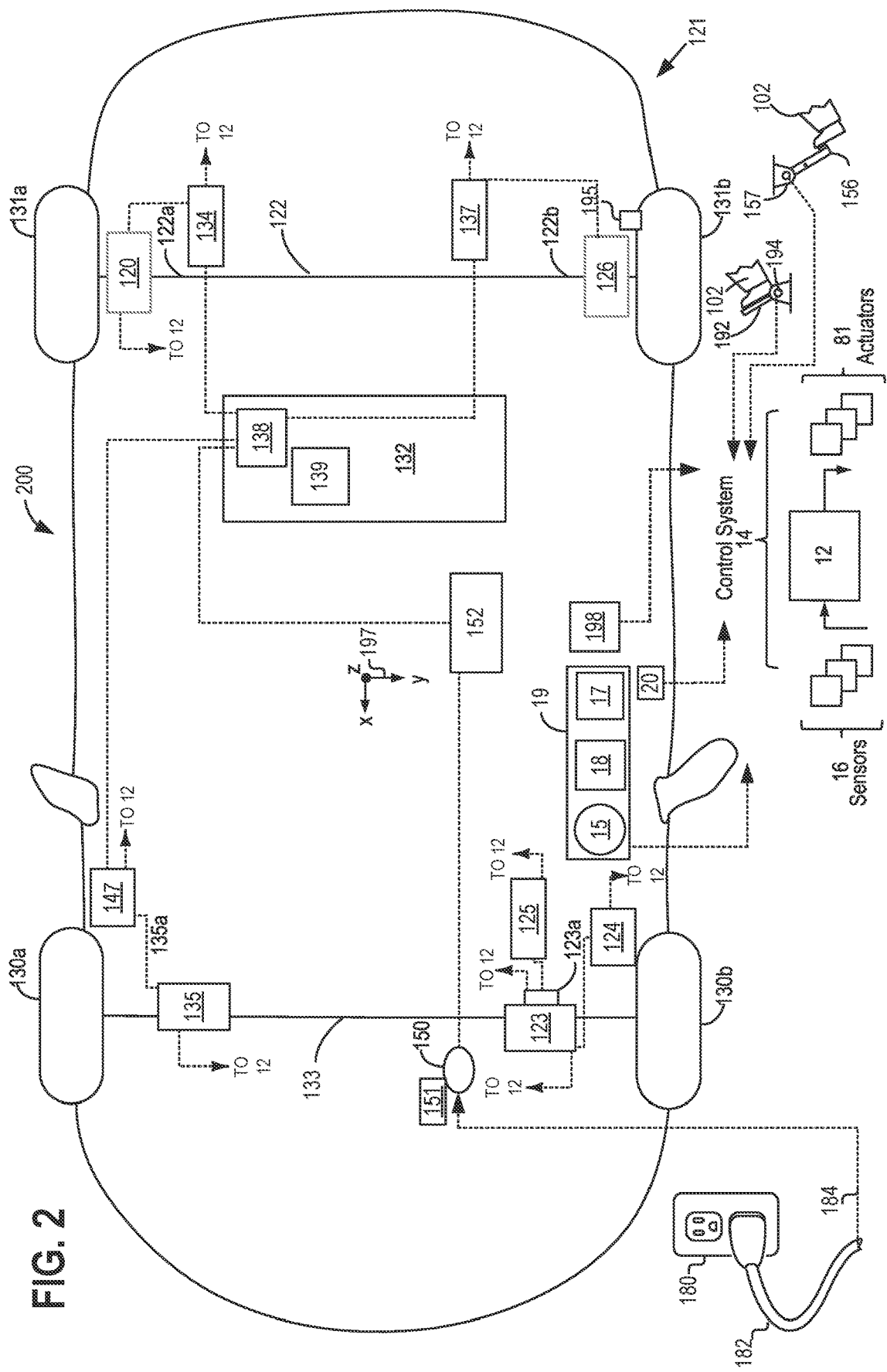
Figure 3:
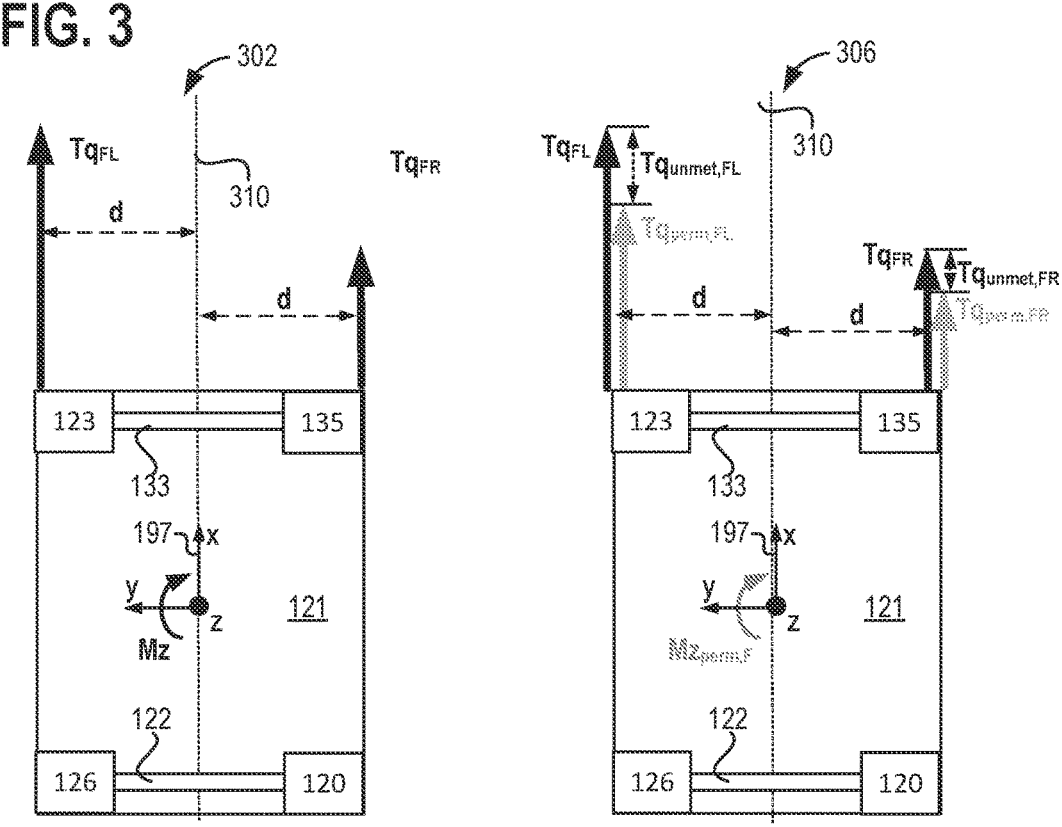
FIGS. 3 and 4 are example schematics showing yaw moments arising from torque applied from electric motors to a driveline axle of the vehicle system of FIGS. 1 and 2.
Figure 4:
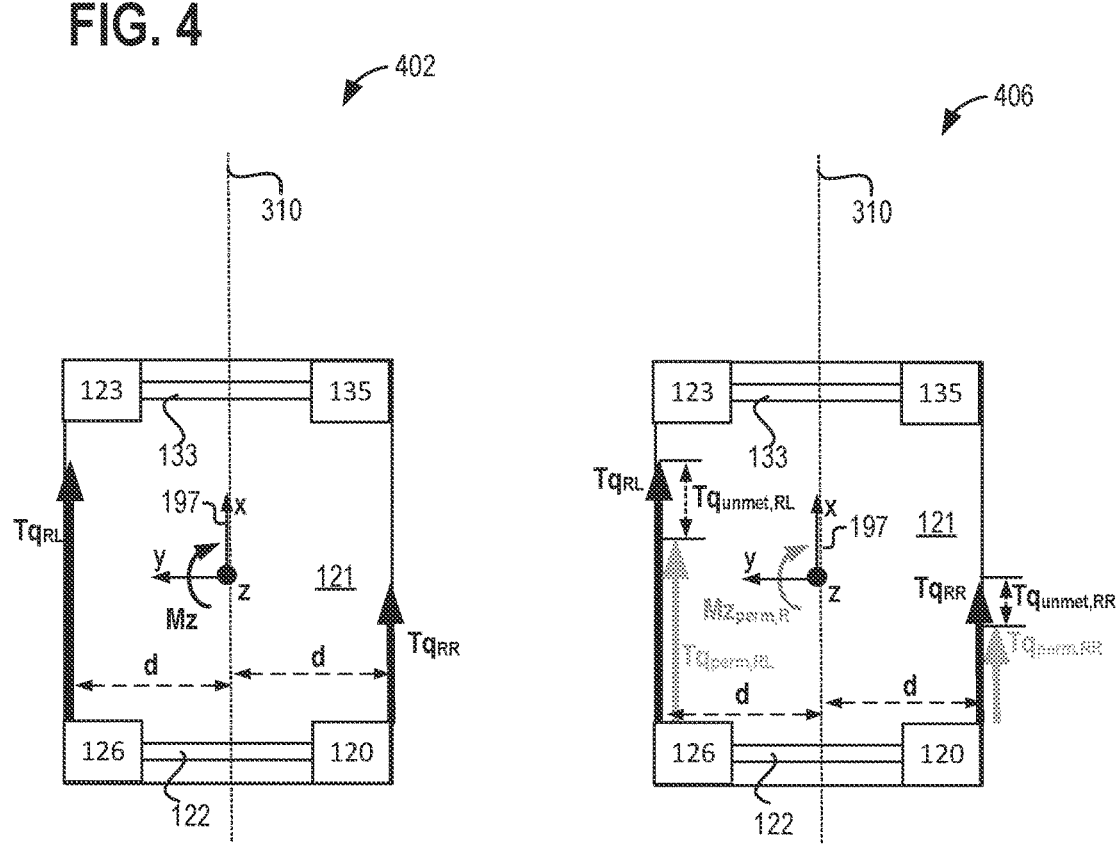

The following description relates to systems and methods for operating a vehicle, including a battery electric vehicle (BEV). FIGS. 1 and 2 show an example vehicle system that includes a driveline including two electric machines coupled to an axle for propelling and/or decelerating the vehicle system. FIGS. 3 and 4 are schematics that illustrate yaw moments arising from torque applied from the electric motors to a driveline axle of the vehicle system. At each of the two electric machines, a motor power and a motor torque may be adjusted to comply with allocated battery power, as further detailed in the methods of FIGS. 5-7. Furthermore, the methods may control the motor power and torque to reduce a deviation in the yaw moment at the axle, while complying with the power allocated to each of the two electric machines from a vehicle battery. These methods are illustrated by the timeline of FIG. 8. Herein, motor power refers to the electrical power supplied to a motor for generating a requested motor torque.

FIGS. 1 and 2 illustrate an example vehicle propulsion system 100 for a vehicle 121. Throughout the description of FIGS. 1 and 2, mechanical connections between various components are illustrated as solid lines, whereas electrical connections between various components are illustrated as dashed or dotted lines. Coordinate system 197 is a right-hand triad coordinate system, including a longitudinal x-axis passing through the center of mass of the vehicle 121 and directed forward, a lateral y-axis directed towards the left as taken from the vehicle driver's viewpoint when facing forward, and a z-axis extending upwards (e.g., perpendicular to the ground for the case where the vehicle is on a flat road). Vehicle propulsion system 100 includes a first electric machine 120, a second electric machine 135, and a third electric machine 123 mechanically coupled to the driveline of the vehicle 121. In one example, each of the first, second, and third electric machines 120, 135, and 123 includes a propulsive force electric machine such as an electric motor. Accordingly, vehicle 121 may include a 3-motor battery electric vehicle (BEV), whereby two of the electric machines (123 and 135) are mechanically coupled to both corners (e.g., at opposite ends) of a front axle 133, and one of the electric machines (120) is mechanically coupled to the rear axle 122. Although not explicitly illustrated in FIG. 1, in an alternative example, the vehicle 121 may further include a 3-motor BEV, whereby two of the electric machines are mechanically coupled to both corners (e.g., at opposite ends) of the rear axle 122 and one of the electric machines is mechanically coupled to the front axle 133.

In an additional or alternative embodiment shown in FIG. 2, vehicle propulsion system 100 may include a fourth electric machine 126. In one example, the fourth electric machine 126 includes a propulsive force electric machine such as an electric motor. Accordingly, vehicle 121 may include a 4-motor battery electric vehicle (BEV), whereby two of the electric machines (123 and 135) are mechanically coupled to both corners (e.g., at opposite ends) of a front axle 133, and the other two of the electric machines (120 and 126) are mechanically coupled to both corners (e.g., at opposite ends) of the rear axle 122. Although not depicted in FIGS. 1 and 2, the methods and systems described herein may also apply to a hybrid electric vehicle (HEV), whereby the vehicle 121 includes a powertrain with an internal combustion engine (not shown) and two electric machines electrically coupled to both corners of a front axle of the HEV or two electric machines electrically coupled to both corners of the rear axle of the HEV.

First, second, third, and fourth electric machines 120, 135, 123, and 126 are communicatively coupled to a controller 12, and are controlled by way of the controller 12. In one example, first, second, third, and fourth electric machines 120, 135, 123, 126 may each operate independently. For example, electric machines 120, 135, 123, 126 may be independently controlled by controller 12 with respect to one or more of torque, Tq, power, P, and motor speed, w. The motor speed may be determined based on the vehicle speed, wheel size, gear ratio, and the like. In another example, the motor speed may be derived directly from measurement with a motor resolver sensor. Controller 12 receives signals from the various sensors shown in FIGS. 1 and 2, as further described herein. In addition, controller 12 employs the actuators shown in FIGS. 1 and 2 to adjust driveline operation responsive to the received signals, and based on instructions stored in memory of controller 12, as exemplified by the methods and systems described herein.

Vehicle propulsion system 100 includes a front axle 133 and a rear axle 122. In some examples, rear axle 122 may comprise two half shafts, for example first half shaft 122a, and second half shaft 122b. Vehicle propulsion system 100 further includes front wheels 130a and 130b, and rear wheels 131a and 131b. As depicted in FIGS. 1 and 2, front wheel 130a may represent the front right (FR) wheel, front wheel 130b may represent the front left (FL) wheel coupled to the front axle at an opposite side of the FR wheel, rear wheel 131a may represent the rear right (RR) wheel, and rear wheel 131b may represent the rear left (RL) wheel coupled to the rear axle at an opposite side of the RR wheel. Furthermore, one or more of the front wheels 130a and 130b, and the rear wheels 131a and 131b, may be driven by way of electrical propulsion sources, such as one of electric machines 120, 135, 123, 126. For example, the rear axle 122 may be mechanically coupled to one or more electric machines such as electric machine 120 and electric machine 126. In FIG. 1, electric machine 120 is positioned at the rear axle 122 between rear wheel 131a and rear wheel 131b. Alternatively, as shown in FIG. 2, the electric machine 120 may be positioned at a corner of rear axle 122 more proximal to rear wheel 131a, and electric machine 126 may be positioned at the other corner of rear axle 122 more proximal to wheel 131b. Electric machine 135 is positioned at a corner of front axle 133 more proximal to the front wheel 130a, and electric machine 123 is positioned at the other corner of front axle 133 more proximal to the front wheel 130b. As described above, in another embodiment, a single electric machine may be coupled to and positioned at the front axle 133 (e.g., between front wheels 130a and 130b) and two electric machines may be coupled to and positioned at the rear axle 122.

Electric machines 120, 135, 123, and 126 may receive electrical power from electric energy storage device 132. In one example, electric energy storage device 132 is an onboard electrical energy storage device such as a high-voltage (HV) battery. In one example, the HV battery includes a rechargeable lithium ion battery. Furthermore, one or more of the electric machines 120, 135, 123, and 126 may include a means for generating electrical power. In particular, electric machines 120, 135, 123, and 126 may generate electrical power by converting the kinetic energy of the vehicle 121 into electrical energy, where the electrical energy may be stored at electric energy storage device 132 for later use by electric machines 120, 135, 123, and/or 126. In one example, upon braking and/or deceleration of the vehicle 121, one or more of the electric machines 120, 135, 123, and/or 126 may rotate in a reverse direction (e.g., reverse direction relative to when the vehicle is in motion and not decelerating or braking). Accordingly, the one or more electric machines 120, 135, 123, and/or 126 may function as a generator, converting the kinetic energy of the decelerating vehicle to electric energy, which can be transferred to the electric energy storage device 132 thereby recharging the electric energy storage device 132 (also known as regenerative braking). The energy applied (from deceleration of the vehicle 121) to rotate the one or more electric machines 120, 135, 123, and/or 126 in a reverse direction is also applied as resistance on the wheels (by way of the front axle 133 and/or rear axle 122 coupled to the one or more electric machines 120, 135, 123, and/or 126) to slow the vehicle without using the conventional wheel brakes (the pads and rotors at each wheel). In one example, when the vehicle operator 102 applies the brakes, the kinetic energy of the vehicle 121 in motion may provide all or most of the initial stopping power until the brake pedal is fully depressed by the operator 102; upon fully depressing the brake pedal, the hydraulic braking system of the vehicle 121 may activate to contact the brake pads against the rotors. In this way, a durability and usable lifetime of the hydraulic braking system (e.g., in particular the brake pads and rotors) may be increased, relative to conventional vehicle braking systems.

A first inverter system controller 134 may convert alternating current (AC) generated by electric machine 120 to direct current (DC) for storage at electric energy storage device 132. Additionally, the first inverter system controller 134 may convert DC transmitted from electric energy storage device 132 to AC for powering the electric machine 120. A second inverter system controller 147 may convert AC generated by electric machine 135 to DC for storage at electric energy storage device 132. Additionally, the second inverter system controller 147 may convert DC transmitted from electric energy storage device 132 to AC for powering the electric machine 135. A third inverter system controller 124 may convert AC generated by electric machine 123 to DC for storage at electric energy storage device 132. Additionally, the third inverter system controller 124 may convert DC transmitted from electric energy storage device 132 to AC for powering the electric machine 123. A fourth inverter system controller 137 may convert AC generated by electric machine 126 to DC for storage at electric energy storage device 132. Additionally, the fourth inverter system controller 137 may convert DC transmitted from electric energy storage device 132 to AC for powering the electric machine 126.

Electric energy storage device 132 may include a battery, capacitor, inductor, or other electric energy storage device. In one example, electric energy storage device 132 may supply power to one or more of electric machines 123, 135, 120, and 126 for driving wheels 130*b*, 130*a*, 131*a*, and 131*b*, respectively. In some examples, electric energy storage device 132 may be configured to store electrical energy that may be supplied to other electrical loads residing on-board the vehicle (other than the electric machines 123, 135, 120, and 126), including HV components for auxiliary vehicle systems such as cabin heating and air conditioning, headlights, cabin audio and video systems, and the like. As such, during vehicle operation, available power from the electric energy storage device 132 may be allocated by the control system 14 to the electric machines 123, 135, 120, and 126 based on these other electrical loads residing on-board the vehicle.

Control system 14 may communicate with one or more of electric energy storage device 132 and electric machines 123, 135, 120 and 126, and receive sensory feedback from one or more of electric energy storage device 132 and electric machines 123, 135, 120 and 126. Further, responsive to the received sensory feedback, control system 14 may send control signals to one or more of electric energy storage device 132 and electric machines 123, 135, 120 and 126. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking by way of the human operator 102, or an autonomous controller. For example, control system 14 may receive sensory feedback from pedal position sensor 157 which communicates with brake pedal 156.

Electric energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to electric energy storage device 132 from power source 180 by way of an electrical energy transmission cable 182. During a recharging operation of electric energy storage device 132 from power source 180, electrical energy transmission cable 182 may electrically couple electric energy storage device 132 and power source 180. In some examples, power source 180 may be connected at inlet port 150. Furthermore, in some examples, a charge status indicator 151 may display a charge status (e.g., state of charge and/or charge capacity) of electric energy storage device 132.

Electric energy storage device 132 includes an electric energy storage device controller 139 and a power distribution module 138. Electric energy storage device controller 139 may provide charge balancing between energy storage elements (e.g., battery cells) and communication with other vehicle controllers (e.g., controller 12). Power distribution module 138 controls flow of power into and out of electric energy storage device 132. In some examples, electrical energy from power source 180 may be received by charger 152. For example, charger 152 may function as a power rectifier by converting alternating current from power source 180 to direct current (DC), for storage at electric energy storage device 132.

While the vehicle propulsion system 100 is operated to propel the vehicle 121, electrical energy transmission cable 182 may be disconnected between power source 180 and electric energy storage device 132. Control system 14 may identify and/or control the amount of electrical energy stored at the electric energy storage device, which may be referred to as the state of charge (SOC). In other examples, electrical energy transmission cable 182 may be omitted, where electrical energy may be received wirelessly at electric energy storage device 132 from power source 180. For example, energy storage device 132 may receive electrical energy from power source 180 by way of one or more of electromagnetic induction, radio waves, and electromagnetic resonance. As such, it should be appreciated that any suitable approach may be used for recharging electric energy storage device 132 from a power source that does not comprise part of the vehicle. In this way, electric machine 120, electric machine 135, and electric machine 123 may propel the vehicle by utilizing a stationary electric power source. In another example, electric energy storage device 132 may be charged by solar power by way of photovoltaic cells mounted at an exterior surface of the vehicle 121.

Controller 12 may comprise a portion of a control system 14. In some examples, controller 12 may be a single controller of the vehicle. Controller 12 as shown in FIG. 1 may be a microcomputer, including a microprocessor unit, input/output ports, an electronic storage medium for executable programs (e.g., executable instructions) and calibration values shown as non-transitory read-only memory chip in this particular example, random access memory, keep alive memory, and a data bus. Control system 14 is shown receiving information from a plurality of sensors 16 (various examples of which are described herein) and sending control signals to a plurality of actuators 81 (various examples of which are described herein). As examples, sensors 16 may include one or more wheel speed sensors 195, motor speed sensors (e.g., including but not limited to a motor resolver sensor), motor torque sensors, ambient temperature/humidity sensor 198, accelerometer 20, digital cameras, vehicle proximity sensors, and the like. Furthermore, actuators 81 may include one or more electric actuators for propelling and/or decelerating the vehicle 121. For example, actuators 81 may include electro-mechanical actuators for applying brakes to the vehicle wheels for deceleration, electric motors 123, 135, 120, and 126 for propelling the vehicle, and the like.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signals identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., one or more of electric machines 123, 135, 120, and 126) based on an operator input. Various examples of the operator interface 15 may include interfaces that require a physical apparatus, such as an active key, that may be inserted into the operator interface 15 to turn on the vehicle, or may be removed to turn off the vehicle. Other examples may include a passive key that is communicatively coupled to the operator interface 15. The passive key may be configured as an electronic key fob or a smart key that does not have to be inserted or removed from the operator interface 15 to operate the vehicle. Rather, the passive key may need to be located inside or proximate to the vehicle (e.g., within a threshold distance of the vehicle). Still other examples may additionally or optionally use a start/stop button that is manually pressed by the operator to turn the vehicle on or off. In other examples, a remote vehicle start may be initiated remote computing device (not shown), for example a cellular telephone, or smartphone-based system where a user's cellular telephone sends data to a server and the server communicates with controller 12 to start the vehicle.

For the case of a BEV, vehicle 121 may be operated according to battery power control and power allocation control. Battery power control refers to ensuring that the instantaneous power usage during vehicle operation from all of the electric motors 123, 135, 120, and 126 and high-voltage (HV) accessories (e.g. HVAC, lights, and the like) does not exceed the total available power from the electric energy storage device 132. Power allocation control refers to regulation and allocation of the available power (excluding power consumption from HV accessories) to each of the electric motors 123, 135, 120, and 126. Power allocation to each of the electric motors 123, 135, 120, and 126 may further depend on operator input when driving the vehicle 121. As examples, operator input when driving the vehicle may include one or more of depressing an accelerator pedal 192, depressing a brake pedal 156, turning a steering wheel, selecting a transmission gear, and the like, to operate the vehicle at a desired speed and in a desired direction. In particular, responsive to operator input, the controller 12 may determine a requested torque, $Tq_i$, to be generated at each of the electric motors 135, 123, 120, and 126 positioned at vehicle wheels 130a, 130b, 131a, and 131b, in order to propel the vehicle at the desired vehicle speed and in the desired direction. Furthermore, responsive to the operator input, the controller 12 may allocate a portion of the available power from the electric energy storage device 132 to each of the electric motors 135, 123, 120, and 126 positioned at vehicle wheels 130a, 130b, 131a, and 131b, in order to generate the corresponding requested torque thereat.

The portion of the available power allocated to each of the vehicle motors in order to generate the corresponding requested torque thereat is also referred to herein as the desired power, $P_i$. The desired power applied from an electric motor at each wheel position may be determined based on the motor speed, w, requested torque, and a motor power loss, P L, according to equations (1):

$$P_i = Tq_i * w_i + P_{L,i} \quad (1)$$

In equation (1), $P_i$ represents the desired electrical power to deliver the requested torque, $Tq_i$ at the current motor speed, $w_i$, and other operating conditions; $P_{L,i}$ represents the motor power loss, where the index, i, corresponds to the $i^{th}$ wheel position where the motor is mechanically coupled to a wheel axle. Herein, $P_i$ may also be referred to as the desired motor axle. Herein, $P_i$ may also be referred to as the desired motor power; furthermore, the desired motor power, requested motor torque, and motor power loss may also be referred to as the desired power, requested torque, and power loss, respectively. In the case of a front axle, the $1^{st}$ and $2^{nd}$ wheel positions may correspond to the FL and FR wheel positions, respectively (or vice versa). Similarly, in the case of a rear axle, the $1^{st}$ and $2^{nd}$ wheel positions may correspond to the RL and RR wheel positions, respectively (or vice versa). The motor power loss, $P_{L,i}$, for each electric motor varies, depending on the value of $Tq_i$ and $w_i$, as well as the motor operating voltage and motor operating temperature. In this way, $P_i$, $Tq_i$, $w_i$, and $P_{L,i}$ may each be determined independently and separately at each $i^{th}$ position.

In some systems, propulsive motor torque and motor power for accelerating the vehicle system may be represented by positive values of $Tq_i$ and $P_i$ (and $P_{L,i}$), whereas negative values of $Tq_i$ and $P_i$ (and $P_{L,i}$) correspond to braking motor torque and braking motor power, including when the vehicle is decelerating. Herein, for simplicity and clarity, $Tq_i$ and $P_i$ (and $P_{L,i}$), generally refer to magnitudes (e.g., positive quantities) of motor torque, motor power, and motor power loss, respectively, whether for when a vehicle is being propelled (accelerating) or braking (decelerating). Furthermore, motor speed, $w_i$, refers to a positive magnitude, when the vehicle is accelerating or braking, and when the vehicle's gear shift level is in "Drive" (e.g., not in "Reverse"). During certain vehicle operating conditions, the motors at the same axle may include both accelerating and braking motor torques. For example, while the vehicle is turning, the front left motor may be supplied with an accelerating power for generating a requested accelerating torque, while the front right motor may be supplied with a decelerating power for generating a requested decelerating torque. As further described below, when the requested motor torque for a first motor at an axle includes an accelerating torque and when the requested motor torque for a second motor at the axle includes a decelerating torque, torque balancing, according to the methods and systems described herein, may not be performed in order to reduce NVH and to comply with motor power thresholds.

Turning now to FIG. 3, it illustrates schematics 302 and 306 depicting the front axle 133 of the vehicle 121 of FIGS. 1 and 2, along with electric motors 123 and 135 positioned at either side of the front axle 133. In particular, schematics 302 and 306 show the requested motor torques, $Tq_{FL}$ and $Tq_{FR}$ (represented with black arrows), arising from vehicle operator input, positioned at the front left (FL) and front right (FR) of the vehicle 121, respectively. Specifically, the controller 12 may allocate a desired power, $P_{FL}$, to the electric motor 123 to provide a requested torque $Tq_{FL}$ for rotating the FL wheel 130b of vehicle 121. Similarly, the controller 12 may allocate a desired power, $P_{FR}$, to the electric motor 135 to provide a requested motor torque $Tq_{FR}$ for rotating the FR wheel 130a of vehicle 121.

Turning now to FIG. 4, it illustrates schematics 402 and 406 depicting the rear axle 122 of the vehicle system 200 of FIG. 2, along with electric motors 126 and 120 positioned at either side of the rear axle 122. In particular, schematics 402 and 406 show the requested motor torques, $Tq_{RL}$ and $Tq_{RR}$ (represented with black arrows), arising from vehicle operator input, positioned at the rear left (RL) and rear right (RR)

of the vehicle 121, respectively. Specifically, the controller 12 may allocate a desired power, $P_{RL}$, to the electric motor 126 to provide a requested torque Tq RL for rotating the RL wheel 131b of vehicle 121. Similarly, the controller 12 may allocate a desired power, $P_{RR}$, to the electric motor 120 to provide a requested torque $Tq_{RR}$ for rotating RR wheel 131a of vehicle 121.

Responsive to the torques $Tq_{FL}$ and $Tq_{FR}$ applied at the front axle 133, and the torques Tq RL and $Tq_{RR}$ generated at the rear axle 122, a yaw moment, $M_Z$ (represented with a curved black arrow), is exerted about the z-axis positioned at a mass center of the vehicle 121, which may aid in guiding motion of vehicle 121 towards a particular direction, thereby increasing vehicle drivability. The yaw moment, Mz, may be expressed as a sum of the yaw moment contributions arising from the motor torque differential at the front axle 133 and the motor torque differential at the rear axle 122, as given by equation (2), where $M_{ZF}$ represents the yaw moment contribution to Mz from the motor torque differential at the front axle 133 and $M_{ZR}$ represents the yaw moment contribution to Mz from the motor torque differential at the rear axle 122.

$$Mz = M_{z_F} + M_{z_R} \tag{2}$$

For example, when $Tq_{FL} > Tq_{FR}$, $M_{ZF}$ may be in a clockwise rotational direction about the z-axis, thereby aiding in directing the vehicle to towards the right. Conversely, when $Tq_{FL} < Tq_{FR}$, Mz may be in a counterclockwise rotational direction about the z-axis, thereby aiding in directing the vehicle towards the left. Similarly, when $Tq_{RL} > Tq_{RR}$, $M_{ZR}$ may be in a clockwise rotational direction about the z-axis, thereby aiding in directing the vehicle to towards the right. Conversely, when $Tq_{RL} < Tq_{RR}$, $M_{ZR}$ may be in a counterclockwise rotational direction about the z-axis, thereby aiding in directing the vehicle towards the left.

$M_{ZF}$ is proportional to the torque differential at the front wheel axle, $\Delta Tq_F$, as given by equation (3):

$$\begin{aligned} Mz_F &= F_{FR} * d - F_{FL} * d \\ &= (Tq_{w,FR}/R_{tire}) * d - (Tq_{w,FL}/R_{tire}) * d \\ &= [(Tq_{FR} * Rm2w)/R_{tire}] * d - [(Tq_{FL} * Rm2w)/R_{tire}] * d \\ &= (Rm2w * d/R_{tire}) * (Tq_{FR} - Tq_{FL}) \\ &= K_F * \Delta Tq_F \end{aligned} \tag{3}$$

where, $$K_F = Rm2w * d/R_{tire}$$

is a proportionality constant.

In equation (3), $F_{FR}$ represents the longitudinal force applied to the front right wheel by the front right motor, FFL represents the longitudinal (e.g., in the x-direction) force applied to the front left wheel by the front left motor, d is the distance between the longitudinal (e.g., in the x-direction) x-axis 310 and a parallel axis passing through the center of each respective wheel (as labeled at FIGS. 3 and 4), $Tq_{wFR}$ is the wheel torque applied to the front right wheel, $Tq_{wFL}$ is the wheel torque applied to the front left wheel, $R_{tire}$ is the tire radius, and Rm2w represents the ratio of the motor torque, $Tq_i$, to the wheel torque, $Tq_{w,i}$ at the $i^{th}$ wheel position.

Analogously, $M_{ZR}$ is proportional to the torque differential at the rear wheel axle, $\Delta Tq_R$, as given by equation (4):

$$\begin{aligned} Mz_R &= F_{RR} * d - F_{RL} * d \\ &= (Tq_{w,RR}/R_{tire}) * d - (Tq_{w,RL}/R_{tire}) * d \\ &= [(Tq_{RR} * Rm2w)/R_{tire}] * d - [(Tq_{RL} * Rm2w)/R_{tire}] * d \\ &= (Rm2w * d/R_{tire}) * (Tq_{RR} - Tq_{RL}) \\ &= K_R * \Delta Tq_R \end{aligned} \tag{4}$$

where, $$K_R = Rm2w * d/R_{tire}$$

is a proportionality constant.

In equation (4), $F_{RR}$ represents the longitudinal (e.g., in the x-direction) force applied to the rear right wheel by the rear right motor, $F_{RL}$ represents the longitudinal (e.g., in the x-direction) force applied to the rear left wheel by the rear left motor, d is the distance between the longitudinal x-axis and a parallel axis passing through the center of each respective wheel (as labeled at FIGS. 3 and 4), $Tq_{wRR}$ is the wheel torque applied to the rear right wheel, $Tq_{wRL}$ is the wheel torque applied to the rear left wheel, $R_{tire}$ is the tire radius, and Rm2w represents the ratio of the motor torque, $Tq_i$, to the wheel torque, $Tq_{w,i}$ at the $i^{th}$ wheel position.

Generally, equations (3) and (4) can be expressed as shown in equation (5).

$$Mz_k = K_k * \Delta Tq_k = K_k * (Tq_i - Tq_j) \tag{5}$$

where, $K_k$ is a proportionality constant.

Here, index k refers to the $k^{th}$ wheel axle, and indices i and j refer to $i^{th}$ and $i^{th}$ wheel positions at the $k^{th}$ axle. As an example, k=F may correspond to the front axle, while i=FL, j=FR correspond to the front left and front right wheels.

Referring to both FIGS. 3 and 4, during certain vehicle operating conditions, allocated power to one or more of the electric motors 123 and 135 of front axle 133, and/or motors 126 and 120 of rear axle 122 may be adjusted from the desired power resulting from operator input to drive the vehicle 121, including when the desired power exceeds a threshold motor power (e.g., $P_{TH,i}$). In one example, responsive to the desired power $P_i$ being greater than a threshold motor power available to be allocated from the electric energy storage device 132 to an electric motor, $P_{TH,i}$, the permitted power for the electric motor (and the corresponding motor torque generated thereby) may be reduced from the desired power (and its corresponding requested torque) to avoid over-use of the available power from the electric energy storage device 132. In this case, a permitted power (also herein referred to as a clipped power, clipped to not exceed $P_{TH,i}$ to the electric motor), $P_{perm,i}$, may be allocated to the electric motor in place of $P_i$, whereby $P_{perm,i} < P_i$. In one example, $P_{perm,i}$ may be set to $P_{TH,i}$. Consequently, the torque provided by the electric motor with the permitted power, a permitted torque (also herein referred to as a clipped torque) $Tq_{perm,i}$ may be less than or equal to the requested torque, $Tq_i$. In this way, the permitted torque, $Tq_{perm,i}$ may be determined to be in compliance with the motor power being within the threshold power, $P_{TH,i}$.

In another example, the permitted torque, $Tq_{perm,i}$ may be determined to be in compliance with the motor power being within the threshold power using equation (6). In particular, $Tq_{perm,i}$ corresponding to $P_{perm,i}$ may be determined by iteratively solving equation (6) subject to $P_{perm,i} < P_{TH,i}$:

$$Tq_{perm,i} = \text{Solve}(P_{perm,i} = Tq_{perm,i} * w_i + P_{L,i}) \tag{6}$$

When solving equation (6), for the case where $P_i > P_{TH,i}$, $Tq_{perm,i}$ is obtained as the maximum permitted motor torque to have its associated electrical power be as close to but not greater than $P_{TH,i}$ (e.g., $P_{perm,i} \leq P_{TH,i}$). For the case where $P_i \leq P_{TH,i}$ (for all $i^{th}$ motors at an axle), no clipping is performed; effectively, the permitted power is set to the desired power, $P_{perm,i} = P_i$, and the permitted torque is set to the requested torque, $Tq_{perm,i} = Tq_i$, and the original desired power, $P_i$, requested torque, $Tq_i$, and wheel speed $w_i$, are applied at each of the $i^{th}$ motors.

$P_{TH,i}$ may vary with the desired power request of each motor, which is determined by motor torque request and motor speed. In one non-limiting example, when the vehicle 121 is accelerating and driving straight, $P_{TH,i}$ may be higher in magnitude for the motors positioned at the rear axle 122 relative to the motors positioned at the front axle 133, because motor torque requests to the motors positioned at the rear axle 122 may be higher in magnitude. Conversely, when the vehicle 121 is decelerating and driving straight, a $P_{TH,i}$ may be smaller in magnitude for the motors positioned at the rear axle 122 relative to the motors positioned at the front axle 133, because motor torque requests to the motors positioned at the rear axle 122 may be smaller in magnitude.

In a further non-limiting example, when the vehicle 121 is turning, a $P_{TH,i}$ may be higher at one side (e.g., outer side relative to the turning radius) of a front and/or rear wheel axle than the other side (e.g., inner side relative to the turning radius). Furthermore, $P_{TH,i}$ may depend on a motor speed ($w_i$), and whether the vehicle is accelerating or decelerating, and being propelled forward or in reverse. When the $i^{th}$ vehicle wheel is accelerating, $P_{TH,i}$ may correspond to a threshold accelerating power above which the motor power supplied to the motor at the $i^{th}$ wheel position may not exceed; when the $i^{th}$ vehicle wheel is decelerating (or braking), $P_{TH,i}$ may correspond to a threshold decelerating (or braking) power above which the motor power supplied to the motor at the $i^{th}$ wheel position may not exceed. During regenerative braking, when one or more of the $i^{th}$ motors may be generating and supplying power to the electrical energy storage device 132, $P_{TH,i}$ may be higher, relative to vehicle operating conditions when there is no regenerative braking.

$P_{TH,i}$ further depends on the available power allocatable from the electric energy storage device 132, which may depend on electrical loads being supplied to auxiliary devices of the vehicle system including such as cabin heating and air conditioning, headlights, cabin audio and video systems, and the like. For example, when electrical loads currently being supplied to auxiliary devices are higher, $P_{TH,i}$ may be lower. Conversely, when electrical loads currently being supplied to auxiliary devices are lower, $P_{TH,i}$ may be higher. The charging and discharging history of the electric energy storage device 132 can also impact the available power allocatable from the electric energy storage device 132 to the electric machines 123, 135, 120, and 126. In particular, if the electric energy storage device 132 is more depleted, $P_{TH,i}$ may be lower, whereas if a state-of-charge of the electric energy storage device 132 is nearer to fully charged, $P_{TH,i}$ may be higher.

The controller 12 may adjust $P_{TH,i}$ for a first motor based on a magnitude of $P_i$ relative to the total power requested from all motors requesting same power direction (e.g., either accelerating/discharge power or decelerating/charging power). For example, in a case where only the FL and RL motors request discharge power, and each requested discharge power is of the same magnitude, then half the total battery discharge power available to all of the motors may be made available for each of the FL and RL motors. In this case, $P_{TH,FL}$ and $P_{TH,RL}$ may be equal to half the total battery discharge power available to all of the motors. In another example, where only the FL and RL motors request discharge power, and $P_{RL} = 1.5\ P_{FL}$, then $P_{TH,RL}$ may include 60% (e.g., 1.5/(1+1.5)) of the total battery discharge power available to all of the motors, while $P_{TH,FL}$ may include 40% (e.g., 1/(1+1.5)) of the total battery discharge power available to all of the motors. In other examples, $P_{TH,i}$ corresponding to total battery charging power may be analogously assigned to each of the motors requesting charging power. Furthermore, $P_{TH,i}$ may be analogously assigned to each of the motors when more than 2 motors have motor power requests in the same power direction.

In FIGS. 3 and 4, $Tq_{perm,FL}$ and $Tq_{perm,FR}$ (represented with gray arrows) refer to the permitted torque at the FL and FR wheel positions, respectively, and $Tq_{perm,RL}$ and $Tq_{perm,RR}$ (represented with gray arrows) refer to the permitted torque at the RL and RR wheel positions, respectively. Schematic 306 illustrates the case where permitted torques $Tq_{perm,FL}$ and $Tq_{perm,FR}$ are applied at the FL and FR wheels of vehicle 121, arising from clipping the desired power allocated to the electric motors 123 and 135, respectively, positioned at the front axle 133 of vehicle 121. Similarly, schematic 406 illustrates the case where clipped torques $Tq_{perm,RL}$ and $Tq_{perm,RR}$ are applied at the RL and RR wheels of vehicle 121, arising from clipping the desired power allocated to the electric motors 126 and 120, respectively, positioned at the rear axle 122 of vehicle 121. In this way, the permitted torques, $Tq_{perm,FL}$ and $Tq_{perm,FR}$, correspond to the permitted powers, $P_{perm,FL}$ and $P_{perm,FR}$, at the front axle, and the permitted torques, $Tq_{perm,RL}$ and $Tq_{perm,RR}$, correspond to the permitted powers, $P_{perm,RL}$ and $P_{perm,RR}$, at the rear axle. As an example, $Tq_{perm,i}$ and $P_{perm,i}$ may be determined by iteratively solving equation (6), as discussed herein.

The difference between the requested torque, $Tq_i$, and the permitted torque, $Tq_{perm,i}$, is an unmet motor torque, $Tq_{unmet,i}$ as given by equation (7):

$$Tq_{unmet,i} = Tq_i - Tq_{perm,i} \qquad (7)$$

Thus, $Tq_{unmet,i} > 0$ corresponds to conditions when the motor torque is clipped to the permitted motor torque in compliance with the permitted motor power. When $Tq_{unmet,i} = 0$, no clipping is performed.

Reducing the desired power to the permitted power (and adjusting the requested torque to the permitted torque correspondingly) at one or more of the electric motors positioned at each side of an axle (e.g., front axle 133 or rear axle 122) may change the torque differential across (e.g., between the left and right sides of) the axle, and may introduce a change to the yaw moment contribution at the axle (e.g., $Mz_F$ or $Mz_R$, respectively). In particular, the yaw moment contribution at the $k^{th}$ axle based on the permitted torques can be expressed by equations (8):

$$Mz_{perm,k} = K_k * \Delta Tq_{perm,k} = K_k * (Tq_{perm,i} - Tq_{perm,j}) \qquad (8)$$

Comparing equation (5) and equation (8), the change in the yaw moment contribution at the $k^{th}$ axle, $\Delta Mz_k$ (a yaw moment contribution differential), arising from clipping $Tq_i$ to $Tq_{perm,i}$ can be expressed by equation (9):

$$\Delta Mz_k = Mz_k - Mz_{perm,k} = K_k * (\Delta Tq_k - \Delta Tq_{perm,k}) \qquad (9)$$

The yaw moment contribution differential, $\Delta Mz_k$, can be expressed in terms of the unmet torque by expanding equation (9) and simplifying:

$$\Delta M z_k = K_k * \left[ (Tq_i - Tq_j) - (Tq_{perm,i} - Tq_{perm,j}) \right] \quad (9a)$$

$$= K_k * \left[ (Tq_i - Tq_{perm,i}) - (Tq_j - Tq_{perm,j}) \right] \quad (9b)$$

$$= K_k * (Tq_{unmet,i} - Tq_{unmet,j}) \quad (9c)$$

As apparent from equation (9a), the yaw moment contribution differential at the $k^{th}$ axle includes a difference between a yaw moment contribution arising from a requested torque differential across the $i^{th}$ motor and the $j^{th}$ motor ($Tq_i$–$Tq_j$), and a yaw moment contribution arising from a permitted torque differential across the $i^{th}$ motor and the $j^{th}$ motor ($Tq_{perm,i}$–$Tq_{perm,j}$). Equation (9a) can be rearranged such that the yaw moment contribution differential at the $k^{th}$ axle includes a difference between the unmet torque at the $i^{th}$ and the unmet torque at the $j^{th}$ motor. Thus, the yaw moment contribution differential at the $k^{th}$ axle can be expressed as an unmet torque differential between the the $i^{th}$ motor and the $j^{th}$ motor, as shown in equation (9c). In particular, the yaw moment contribution differential arising from clipping motor torques in compliance with the allocated motor power is given by equation (10):

$$\Delta M z_k = K_k \Delta Tq_{unmet,k} \quad (10)$$

Furthermore, the change in the yaw moment arising from clipping motor torques in compliance with the allocated motor power is given by the sum of the yaw moment contribution differentials arising from clipping motor torques in compliance with the allocated motor power at each $k^{th}$ axle, as show in equation (11):

$$\Delta M z = \Sigma_k \Delta M z_k \quad (11)$$

Here, $\Delta Tq_{unmet,k}$ refers to the unmet torque differential across the $k^{th}$ axle. Thus, when $\Delta Tq_{unmet,k}$ is 0, such as when the unmet torques, $Tq_i$ and $Tq_j$ at the $k^{th}$ wheel axle are balanced (e.g., equal), the change in the yaw moment contribution (e.g., the yaw moment contribution differential), $\Delta M z_k$, is 0. Furthermore, by reducing $\Delta Tq_{unmet,k}$, $\Delta M z_k$ can be reduced. As apparent from equations (9a), (9b), (9c), and (11), the yaw moment deviation, arising from clipping the requested motor torque to the permitted motor torque at each of the motors positioned at a $k^{th}$ axle, can be eliminated by fully balancing the unmet motor torques across the motors positioned at the $k^{th}$ axle, including reducing the permitted motor torque at one or both of the motors positioned at the $k^{th}$ axle; furthermore, the yaw moment deviation, arising from clipping the requested motor torque to the permitted motor torque at each of the motors positioned at a $k^{th}$ axle, can be reduced by partially balancing the unmet motor torques across the motors positioned at the $k^{th}$ axle, including reducing the permitted motor torque at one or both of the motors positioned at the $k^{th}$ axle.

In other words, by balancing or by partially balancing the unmet torques $Tq_i$ and $Tq_j$ at the $k^{th}$ wheel axle, $\Delta M z_k$ (and $\Delta M z$) can be eliminated or reduced, respectively, thereby increasing vehicle drivability, while the motor powers, $P_i$, are in compliance with the threshold motor powers, $P_{TH,i}$ Furthermore, in this way, balancing the unmet torque at the two motors of an axle can maintain the intended yaw moment (e.g., the yaw moment based on the original requested motor torques) or can aid in reducing a deviation from the intended yaw moment, while maintaining compliance with the battery power allocated to the two motors.

Figure 5:
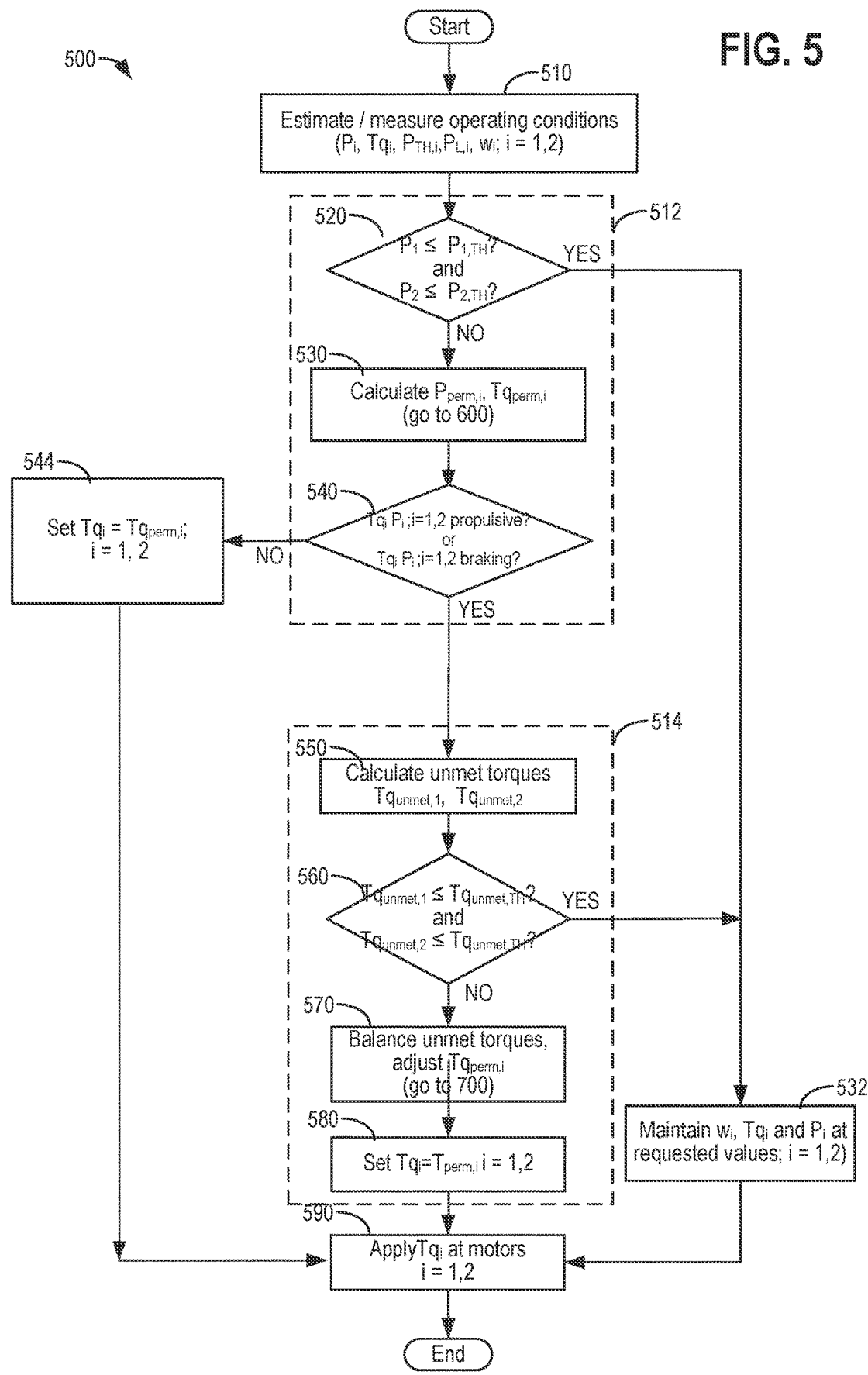
FIGS. 5-7 are example flow charts representing a method of operating the vehicle system of FIGS. 1 and 2, including controlling the torque at the electric motors.
Figure 6:
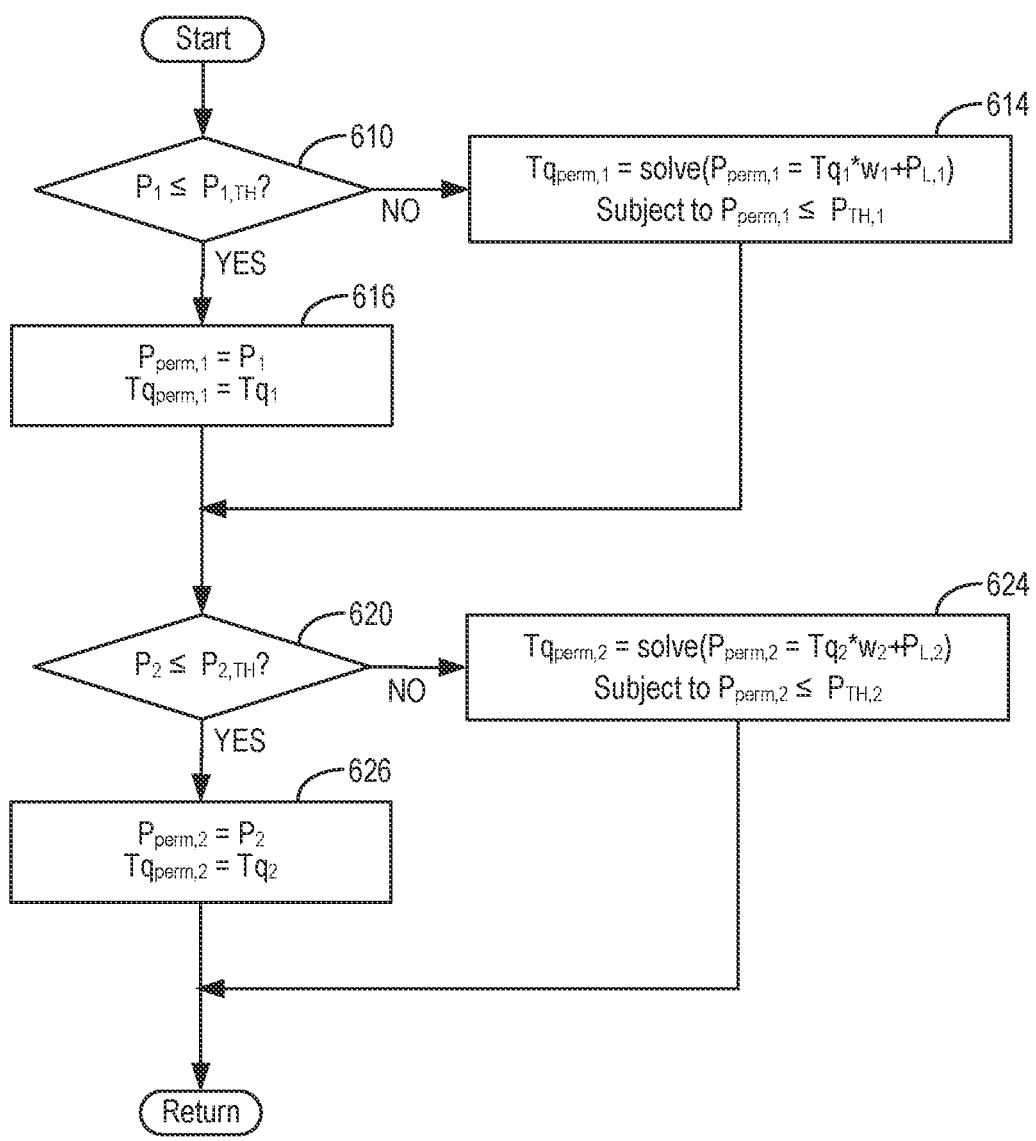
Figure 7:
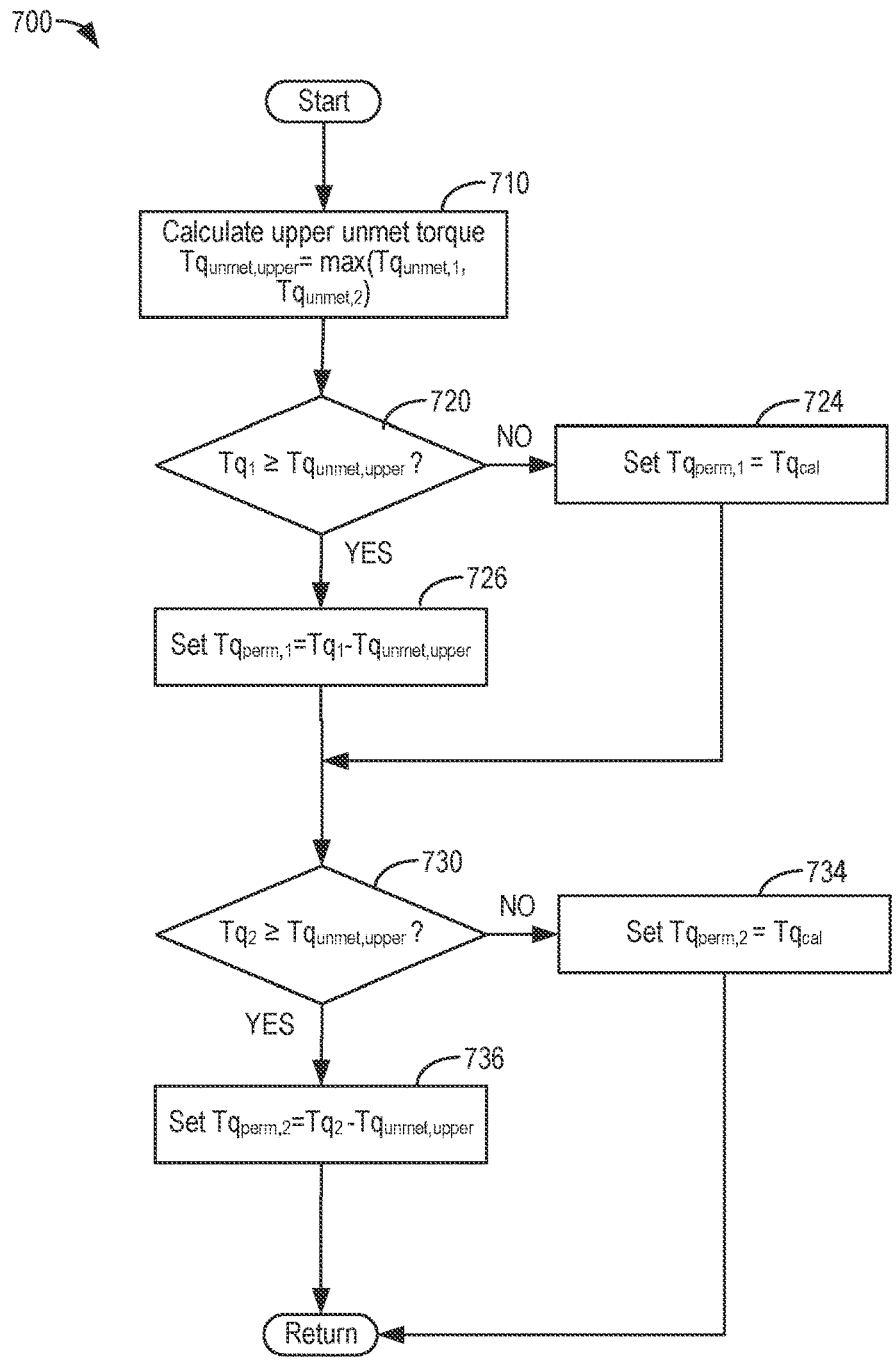
Figure 8:
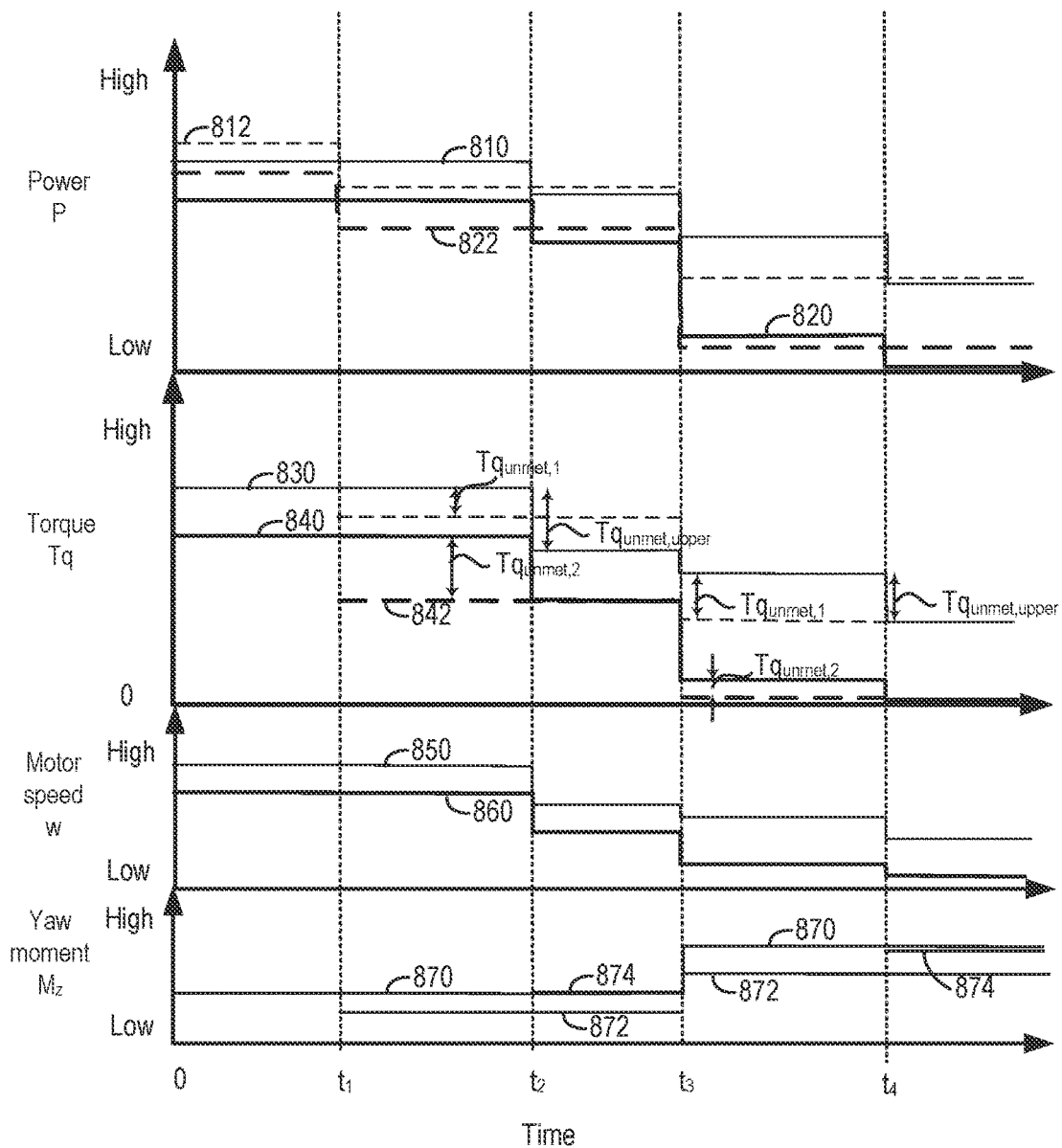
FIG. 8 is an example timeline illustrating operation of the vehicle system of FIGS. 1 and 2 according to the methods of FIGS. 5-7.

Turning now to FIGS. 5-7 they illustrate flow charts for methods 500, 600, and 700 of operating vehicle 121, including setting a requested motor torque to a permitted motor torque in compliance with a threshold motor power, and balancing (or partially balancing) the unmet torque at a wheel axle, thereby increasing vehicle drivability. Methods 500, 600, and 700 may be executed by a controller 12 based on instructions stored on a non-transitory memory of the controller 12 and in conjunction with signals received from sensors of the vehicle propulsion system 100, such as the sensors described above with reference to FIGS. 1 and 2. The controller 12 may employ actuators of the vehicle propulsion system 100 to adjust vehicle operation, according to the methods described below. Furthermore, methods 500, 600, and 700 may be applied to any $k^{th}$ axle of the vehicle 121 with two electric machines coupled thereto at the $i^{th}$ positions for driving vehicle wheels coupled thereat. Thus, in the vehicle 121 of FIGS. 1 and 2, methods 500, 600, and 700 may be executed for controlling the electric motors 123 and 135 of the front axle 133 and/or the electric motors 120 and 126 of the rear axle 122. In other words, methods 500, 600, and 700 may be applied to each $k^{th}$ wheel axle having 2 electric machines (i=1, 2) thereat for driving vehicle wheels coupled thereat.

Method 500 begins at 510 where the controller 12 estimates and/or measures various operating conditions of the vehicle 121 including, at each motor of an axle, the motor speed ($w_i$), desired power ($P_i$), requested torque ($Tq_i$), the threshold motor power ($P_{TH,i}$), the power loss ($P_{L,i}$), and the like. The index, i, refers to the position of the $i^{th}$ motor at the $k^{th}$ wheel axle. As one example, i=1 or 2, where i=1 may correspond to a motor located at a wheel corner at a left side of a wheel axle of the vehicle while i=2 may correspond to a motor located at a wheel corner at a right side of the same wheel axle of the vehicle. As described above, $P_i$, $Tq_i$, $P_{TH,i}$, and $P_{L,i}$ may be determined independently and separately at each $i^{th}$ position. Furthermore, additional operating conditions such as the vehicle speed, wheel speed, and the like may be measured and/or estimated at 510.

Method 500 continues at 520 where the controller 12 evaluates if the desired power, $P_i$, of each motor (e.g., each motor at $i^{th}$ positions, i=1, 2) of the wheel axle are less than their respective threshold powers, $P_{TH,i}$. For the case where $P_i \leq P_{TH,i}$ for i=1, 2, method 500 continues at 532 where the controller 12 maintains the current desired and/or requested values of $w_i$, $Tq_i$, and $P_i$ at the wheel axle. Thus, when $P_i \leq P_{TH,i}$ for i=1, 2, the allocated power from the electric energy storage device 132 to each $i^{th}$ motor is sufficient for supplying the desired power, $P_i$, and the requested torque, $Tq_i$, thereto in order to maintain the requested wheel speed, $w_i$.

For the case where $P_i$ is not less than or equal to $P_{TH,i}$ for at least one of the $i^{th}$ motors (i=1, 2), method 500 continues at 530 where the controller 12 calculates a permitted power, $P_{perm,i}$, and a permitted torque, $Tq_{perm,i}$, for each $i^{th}$ electric motor, as described by method 600 of FIG. 6. Method 600 illustrates an example flow chart for calculating values of the permitted power, $P_{perm,i}$ and the permitted torque, $Tq_{perm,i}$ in compliance with their respective threshold power, $P_{TH,i}$. Being in compliance with the respective threshold power, $P_{TH,i}$, refers to $P_{perm,i} \leq P_{TH,i}$ where $P_{perm,i}$ corresponds to the power allocated to the $i^{th}$ motor for generating $Tq_{perm,i}$.

Method 600 begins at 610 where the controller 12 determines if the desired power of the first motor at the axle of the vehicle 121 is less than the threshold power thereat (e.g., $P_i \leq P_{TH,1}$). Responsive to $P_1 \leq P_{TH,1}$, method 600 continues at 616 where the controller 12 sets the permitted power of the first motor and the permitted torque of the first motor to the desired power and the requested torque, respectively (e.g., $P_{perm,1} = P_1$ and $Tq_{perm,1} = Tq_1$). Returning to 610, for the case where $P_1$ is not less than $P_{TH,1}$, method 600 continues to 614 where the controller 12 determines $P_{perm,i}$ and $Tq_{perm,1}$ by iteratively solving equation (6), while maximizing $P_{perm,1}$ subject to the constraint that $P_{perm,1} \le P_{TH,1}$.

Following 614 and 616, method 600 continues at 620 where the controller 12 determines if the desired power of the second motor at the axle of the vehicle 121 is less than the threshold power thereat (e.g., $P_2 \le P_{TH,2}$). Responsive to $P_2 \le P_{TH,2}$, method 600 continues at 626 where the controller 12 sets the permitted power of the second motor and the permitted torque of the second motor to the desired power and the requested torque thereat, respectively (e.g., $P_{perm,2} = P_2$ and $Tq_{perm,2} = Tq_2$). Returning to 620, for the case where $P_2$ is not less than $P_{TH,2}$, method 600 continues to 624 where the controller 12 determines $P_{perm,2}$ and $Tq_{perm,2}$ by iteratively solving equation (6), while maximizing $P_{perm,2}$ subject to the constraint that $P_{perm,2} \le P_{TH,2}$. Following 624 and 626, method 600 ends, returning to method 500 after 530.

As described above, each of $w_i$, $P_i$, $Tq_i$, $P_{TH,i}$, and $P_{L,i}$ represent positive magnitudes. Related, at any given time when the vehicle is operating, each of $w_i$, $P_i$, $Tq_i$, $P_{TH,i}$, and $P_{L,i}$ may represent propulsive values corresponding to an accelerating $i^{th}$ wheel; similarly, each of $w_i$, $P_i$, $Tq_i$, $P_{TH,i}$, and $P_{L,i}$ represent braking values corresponding to a decelerating $i^{th}$ wheel. Additionally, both $Tq_{perm,i}$ and $T_{perm,i}$ are used interchangeably herein to refer to a permitted motor torque. When the requested motor torque for a first motor at a $k^{th}$ axle includes an accelerating torque and when the requested motor torque for a second motor at the same $k^{th}$ axle includes a decelerating torque, torque balancing may not be performed in order to avoid increasing NVH and to maintain compliance with motor power thresholds. Thus, at 540, the controller 12 determines if all $Tq_i$ and $P_i$ for $i=1, 2$ are propulsive values, or if all $Tq_i$ and $P_i$ for $i=1, 2$ are braking values. Responsive to all $Tq_i$ and $P_i$ for $i=1, 2$ not corresponding to propulsive values, or responsive to all $Tq_i$ and $P_i$ for $i=1, 2$ not corresponding to braking values, method 500 continues at 544 where the controller 12 sets the requested motor torque to the permitted motor torque, $Tq_i = T_{perm,i}$ without completing the torque balancing (elements of dashed box 514). Following 544, method 500 continues at 590.

Responsive to all $Tq_i$ and $P_i$ for $i=1, 2$ being propulsive values, or responsive to all $Tq_i$ and $P_i$ for $i=1, 2$ being braking values, and responsive to the first condition being satisfied (elements of dashed box 512), method 500 continues at 550 where the controller 12 calculates the unmet torques, $Tq_{unmet,i}$ for $i=1, 2$, from the difference between the requested torque and the permitted torque at each $i^{th}$ motor, according to equation (7). Next, method 500 continues at 560 where the controller 12 determines if $Tq_{unmet,i} = 0$ for $i=1, 2$. Although $P_i$ is not less than or equal to $P_{TH,i}$ for all $i=1, 2$ (as determined at 520), it may be possible for $Tq_i = T_{perm,i}$ (as calculated at 530 and at method 600), depending on the relationship between $T_{perm,i}$ and $P_{perm,i}$ (as given by equation (6)), and especially when $P_i$ may be only slightly greater than $P_{TH,i}$ (and when $P_{perm,i}$ is closer to $P_i$). For example, under conditions where $P_{perm,i} \sim P_i \sim P_{TH,i}$, then $Tq_{perm,i}$ may not be substantially different from $Tq_i$. Thus, under these circumstances, clipping of the desired motor power and clipping of the requested motor torque may be less substantial, meaning that $Tq_{perm,i}$ may not be substantially different from $Tq_i$ such that $Tq_{unmet,i}$ may be less than or equal to a threshold unmet motor torque, $Tq_{unmet,TH}$. Hence, at 560, for the case where $Tq_{unmet,i} < Tq_{unmet,TH}$ for $i=1, 2$, substantial clipping of the desired motor power and motor torque at each motor of the axle has not occurred, meaning the unmet torques are balanced and the yaw moment contribution at the axle is substantially unchanged (relative to the yaw moment contribution arising from the requested motor torques, $Tq_i$), and method 500 continues at 532 where the controller 12 maintains $w_i$, $Tq_i$, and $P_i$ for $i=1, 2$. In one example, $Tq_{unmet,TH}$ may be 3 Nm or less (but greater than 0 Nm).

When one or more of $Tq_{unmet,i}$ is greater than $Tq_{unmet,TH}$ at 560, the unmet torques are imbalanced and the yaw moment contribution at the axle may be changed (relative to the yaw moment contribution arising from the requested torques, $Tq_i$), and method 500 continues at 570 and method 700 where the controller 12 adjusts $Tq_{perm,i}$ to balance (or partially balance) the unmet torques. Method 700 includes two approaches for adjusting the permitted torques for motor torque balancing at the wheel axle, as described at 702. Responsive to when the requested motor torque, $Tq_i$ is greater than an upper unmet motor torque ($Tq_{unmet,upper}$) at each of the $i^{th}$ motors (e.g., $i=1, 2$), method 700 sets $Tq_{unmet,i}$ at each of the $i^{th}$ motors to the upper unmet torque, thereby making $Tq_{unmet,1} = Tq_{unmet,2} = Tq_{unmet,upper}$, and fully balancing the unmet torques at each of the $i^{th}$ motors, whereby $Tq_{perm,i} = Tq_i - Tq_{unmet,upper}$. Responsive to one of the requested motor torques, $Tq_i$, being less than the upper unmet torque, method 700 partially balances the unmet torques by setting the unmet torque corresponding to the one of the requested motor torques, $Tq_i$, being less than the upper unmet torque, to $Tq_i$ minus a threshold calibration torque, $Tq_{cal}$, effectively making that $Tq_{perm,i} = Tq_{cal}$. In one example, $Tq_{cal}$ is less than or equal to 2 Nm (but greater than 0 Nm). In this way, the imbalance in the unmet torques is reduced as much as possible (unmet torques are partially balanced) without introducing a negative (or an opposite) magnitude $Tq_{perm,i}$ (and a negative or opposite magnitude corresponding $Tq_i$), which is undesirable due to NVH and possible violation of power thresholds. Here, an opposite magnitude Tq value may include a braking (decelerating) torque when the original requested torque, $Tq_i$, is an accelerating torque; or an opposite magnitude Tq value may include an accelerating torque when the original requested torque, $Tq_i$, is a braking (decelerating) torque.

Method 700 begins at 710 where the controller 12 calculates the upper unmet torque, $Tq_{unmet,upper}$, as the maximum value of $Tq_{unmet,i}$, as given by equation (12):

$$Tq_{unmet,upper} = \max(Tq_{unmet,i}; i=1,2) \quad (12)$$

Next, method 700 continues at 720 where the controller 12 determines if the requested motor torque at the first motor, $Tq_1$, is greater than or equal to $Tq_{unmet,upper}$. Responsive to $Tq_1 < Tq_{unmet,upper}$, method 700 continues at 724 where the controller 12 sets $Tq_{perm,1} = Tq_{cal}$, effectively making $Tq_{unmet,1} = Tq_1 - Tq_{cal}$. In other words, the controller 12 reduces the unmet torque, $Tq_1$ as much as possible (thereby making $Tq_{perm1} = Tq_{cal}$) without introducing a negative magnitude $Tq_{perm,1}$, which would undesirably lead to increased NVH. Furthermore, because $Tq_{perm,1}$ is reduced to $Tq_{cal}$, the adjustment to $Tq_{perm,1}$ remains in compliance with the threshold motor power, $P_{TH,1}$.

Returning to 720, for the case where $Tq_1 \ge Tq_{unmet,upper}$, method 700 continues at 726 where the controller 12 sets $Tq_{perm,1} = Tq_1 - Tq_{unmet,upper}$, thereby effectively setting $Tq_{unmet,1} = Tq_{unmet,upper}$, while maintaining compliance with the threshold motor power, $P_{TH,1}$.

Next, method 700 continues at 730 from 724 and 726, where the controller 12 determines if the requested motor torque at the second motor, $Tq_2$, is greater than or equal to $Tq_{unmet,upper}$. Responsive to $Tq_2<Tq_{unmet,upper}$, method 700 continues at 734 where the controller 12 sets $Tq_{perm,2}=Tq_{cal}$, effectively making $Tq_{unmet,2}=Tq_2-Tq_{cal}$. In other words, the controller 12 reduces the unmet torque, $Tq_2$ as much as possible (thereby making $Tq_{perm2}=Tq_{cal}$) without introducing a negative magnitude $Tq_{perm,2}$, which would undesirably lead to increased NVH. Furthermore, because $Tq_{perm,2}$ is reduced to $Tq_{cal}$, the adjustment to $Tq_{perm,2}$ remains in compliance with the threshold motor power, $P_{TH,2}$.

Returning to 730, for the case where $Tq_2 \geq Tq_{unmet,upper}$, method 700 continues at 736 where the controller 12 sets $Tq_{perm,2}=Tq_2-Tq_{unmet,upper}$, thereby effectively setting $Tq_{unmet,2}=Tq_{unmet,upper}$, while maintaining compliance with the threshold motor power, $P_{TH,2}$. After 734 and 736, method 700 ends, returning to method 500 after 570.

As such, at method 700, when $Tq_i \geq Tq_{unmet,upper}$ at each $i^{th}$ motor (e.g., i=1, 2), the controller 12 fully balances the unmet torques by setting each $Tq_{unmet,i}=Tq_{unmet,upper}$ and by setting $Tq_{perm,i}=Tq_i-Tq_{unmet,upper}$ at 726 and 736; effectively, for the case where $Tq_{unmet,1} \neq Tq_{unmet,2}$, at one of the it h motors, where $Tq_{unmet,i}<Tq_{unmet,upper}$ (prior to 726 and 736), $Tq_{perm,i}$ is reduced from its original value (as calculated from method 600); at the other of the it h motors, where $Tq_{unmet,i}=Tq_{unmet,upper}$, $T_{perm,i}$ is maintained. For the case where $Tq_{unmet,i}=Tq_{unmet,2}=Tq_{unmet,upper}$, effectively, $T_{perm,i}$ (as calculated from method 600) is maintained for all it h positions. Fully balancing the unmet torques maintains the yaw moment contribution at the $k^{th}$ wheel axle, $Mz_k$, arising from the requested torques, $Tq_i$, while maintaining compliance with $P_{perm,i}<P_{TH,i}$ for i=1, 2 (as described herein in relation to equations (4) and (9)).

In contrast, when $Tq_i<Tq_{unmet,upper}$ for one of the it h motors, the controller 12 partially balances the unmet torques by setting $Tq_{perm,i}=Tq_{cal}$ (at one of 724 or 734) corresponding to the one of the it h motors having $Tq_i<Tq_{unmet,upper}$, while setting $Tq_{perm,i}=Tq_i-Tq_{unmet,upper}$ (at one of 726 or 736) corresponding to the other of the $i^{th}$ motors having $Tq_i \geq Tq_{unmet,upper}$ (and for which $Tq_{unmet,i}=Tq_{unmet,upper}$). Partially balancing the unmet torques reduces a change in the yaw moment contribution (as given by equation (10)) as much as possible without introducing a negative magnitude motor torque and while maintain compliance with $P_{TH,i}$ for i=1, 2.

Returning to method 500 after 570, the method continues at 580 where the controller 12 sets the requested motor torque to the permitted motor torque, $Tq_i=T_{perm,i}$. Setting $Tq_i=T_{perm,i}$ after balancing (or partially balancing) the unmet torques $Tq_{unmet,i}$ and adjusting $T_{perm,i}$ at 570 by way of method 700 reduces as much as possible, any change in the yaw moment contribution (as given by equation (10)) at the $k^{th}$ axle, thereby maintaining drivability as well as compliance with $P_{TH,i}$. At 580, adjusting $Tq_{perm,i}$ to balance (or partially balance) the unmet torques may responsively change both the motor power, $P_i$, and the achievable motor speed, $w_i$, as well as the vehicle speed. In this way, the methods 500, 600 and 700 prioritize maintaining vehicle yaw motion as compared with maintaining vehicle longitudinal motion (including vehicle speed and motor speed). Next, after 532, 544, and 580, method 500 continues at 590 where the controller 12 applies $Tq_i$ at each of the motors (e.g., i=1, 2). After 590, method 500 ends.

As shown in FIG. 5, the series of method steps included in dashed box 514 including 550, 560, 570 (including execution of method 700), and 580 may be executed responsive to satisfying a first condition as indicated by dashed box 512. The first condition being satisfied includes when $Tq_i$ and $P_i$ are propulsive torques and powers for all i=1, 2 or are braking torques and powers for all i=1, 2 (as shown at 540 of FIG. 5), and when $P_i \geq P_{TH,i}$ for at least one of i=1, 2 (as shown at 520 of FIG. 5).

Turning now to FIG. 8, it illustrates an example timeline 800 for operating the vehicle system 100 according to the methods 500, 600, and 700. In the example of FIG. 8, vehicle system 100 includes an axle with first and second electric motors coupled thereto, each for driving a separate vehicle wheel coupled to the axle. In some examples, the vehicle system 100 may include 2 or more axles, each with two electric motors coupled thereto, each of the electric motors for driving a separate vehicle wheel coupled to the axles. Furthermore, vehicle system 100 may include an HEV, BEV, or other electric vehicle. Trend lines are shown for a desired power at a first motor, $P_1$ 810, a desired power at a second motor, $P_2$ 820, a requested torque at the first motor, $Tq_1$ 830, a requested torque at the second motor, $Tq_2$ 840, a first motor speed, $w_1$ 850, a second motor speed, $w_2$ 860, a yaw moment, $Mz_{orig}$ 870 (as given by equation (5)) arising from original requested motor torque values (e.g., $Tq_i$ prior to any power and/or torque clipping in compliance with $P_{TH,i}$), a yaw moment $Mz_{perm}$ 872 (as given by equation (8)) arising from the permitted motor torque values (e.g., $Tq_{perm,i}$ in compliance with the threshold $P_{TH,i}$), and a yaw moment $Mz_{bal}$ 874 (as given by equation (5)) arising from the balanced motor torque values (e.g., $Tq_i$ after torque balancing determined at 514 of method 500). Also shown are threshold values for the desired power at each motor, $P_{TH,1}$ 812 and $P_{TH,2}$ 822, and the permitted torques at each motor, $Tq_{perm,1}$ 832 and $Tq_{perm,2}$ 842. Timeline 800 further shows the unmet torques $Tq_{unmet,1}$, $Tq_{unmet,2}$, and the upper unmet torque, $Tq_{unmet,upper}$. For clarity, the example timeline 800 depicts step changes to $P_i$, $Tq_i$, $Tq_{perm,i}$, $w_i$, and Mz occurring sequentially at discrete moments in time, however, in reality, some of the changes may occur simultaneously or concurrently in time.

Between time 0 and time $t_1$, the desired power at each $i^{th}$ motor, $P_i$ (i=1, 2) is less than their respective corresponding threshold power, $P_{TH,i}$ indicating that the desired power and requested torque at each of the motors are in compliance with the threshold power at each motor. Thus, responsive to $P_i \leq P_{TH,i}$ (i=1, 2), the controller 12 allocates the desired power at each motor, $P_i$, to generate the requested torques at each motor, $Tq_i$, at the motor speeds, $w_i$. Furthermore, the yaw moment contribution 870 at the axle arising from the requested torques, $Tq_i$, is maintained without torque balancing. As an example, prior to time $t_1$, the vehicle system 100 may be cruising on a level road, and the electric energy storage device 132 may not be allocating any power to auxiliary electrical loads.

At time $t_1$, the desired power requested to other motors, including one or more motors on another $k^{th}$ axle may be increased, or auxiliary electrical loads such as the vehicle headlights and A/C system may be switched ON, thereby reducing a threshold allocated power, $P_{TH,i}$, available to be supplied to each of the motors from the electric energy storage device 132. In another example, a threshold power (e.g., $P_{TH,i}$) for a particular motor may decrease in response to an increase to a desired power requested to one or more other motors, especially if the desired power requested to that particular motor is maintained; in this way, the total battery power may be dynamically allocated to each motor. Thus, responsive to the increased auxiliary load and/or the increase in electrical power requested to other motors at time $t_1$, the threshold powers, $P_{TH,i}$ decrease below the desired powers, $P_i$. Responsive to $P_1>P_{TH,1}$ and $P_2>P_{TH,2}$ at time $t_1$, the controller 12 iteratively calculates $P_{perm,i}$ and $Tq_{perm,i}$ for i=1, 2, as given by equation (6), whereby $Tq_{perm,i}$ is determined as the maximum permitted $i^{th}$ motor torque to have its associated electrical power, $P_{perm,i}$ be as close to but not greater than $P_{TH,1}$ (e.g., $P_{perm,i} \leq P_{TH,i}$) In the example timeline 800, the desired powers and requested torques for the first and second motors are all accelerating values or are all braking values. Thus, responsive to the first condition being satisfied, as shown between time $t_1$ and time $t_2$, the controller 12 proceeds to calculating and balancing the unmet torques at the first and second motors of the axle.

Next, the controller 12 calculates the unmet torques, $Tq_{unmet,1}$ and $Tq_{unmet,2}$, from the differences between $Tq_i$ and $Tq_{perm,i}$ and then calculates the upper unmet torque, $Tq_{unmet,upper}$. Between time $t_1$ and time $t_3$, the yaw moment $Mz_{perm}$ 872 (based on $Tq_{perm,i}$) is substantially different than the original yaw moment 870 (based on the requested torques, $Tq_i$), indicating that at least one of the $Tq_{unmet,i}$ are substantial (e.g., $Tq_{unmet,i} > Tq_{unmet,TH}$). At time $t_2$, responsive to $Tq_{unmet,i} > Tq_{unmet,TH}$ for i=1 and/or 2, the controller 12 continues balancing the unmet torques. In particular, as shown at time $t_2$, responsive to $Tq_i > Tq_{unmet,upper}$ for i=1, 2, the controller 12 continues with balancing the unmet torques by setting $Tq_{unmet,i} = Tq_{unmet,upper}$ for i=1, 2, according to method 700. As such, the controller 12 reduces the permitted torque at one or both of the $i^{th}$ motors by setting $Tq_{perm,i} = Tq_i - Tq_{unmet,upper}$ to balance the unmet torques. Subsequently, but also shown at time $t_2$ (for clarity), the controller 12 sets $Tq_i = T_{perm,i}$ at each $i^{th}$ motor, and recalculates the corresponding $P_i$ and $w_i$ (i=1, 2) given the new (unmet torque-balanced) values of $Tq_i$. As shown in timeline 800, the recalculated values of $P_i$ (810, 820) are less than their respective threshold powers, $P_{TH,i}$ (812, 822), thereby maintaining compliance with the threshold powers $P_{TH,i}$ at each motor. Concurrently, in balancing the unmet torques, the yaw moment (Mz) is maintained at time $t_2$ ($Mz_{bal}$ 874 is equal to $Mz_{orig}$ 870) because balancing the unmet torques maintains the torque differential arising from the original requested $Tq_i$ at time $t_1$. At time $t_2$, in the example of timeline 800, motor speeds, $w_i$, are shown to decrease from their values prior to time $t_2$, reflecting the decrease in $Tq_i$ and $P_i$ from their original values at time $t_1$. In other examples, the motor speed may not decrease responsive to a decrease in $Tq_i$, whereby $Tq_i$ remains positive; rather, only a rate of change in the magnitude of $w_i$ may be reduced, and not the magnitude of $Tq_i$, responsive to a decrease in $Tq_i$. Furthermore, the direction of $w_i$ may not change responsive to a decrease in $w_i$.

Next, at time $t_3$, the timeline 800 illustrates vehicle operating conditions where the threshold power, $P_{TH,i}$, allocatable to each of the $i^{th}$ motors is further reduced relative to times prior to time $t_3$, for example, when the electric energy storage device 132 state-of-charge is lower and/or when power request to motors on the other axle may be increased, and/or when substantial auxiliary electric loads such as the A/C and headlights are switched on. As such, at time $t_3$, the threshold powers, $P_{TH,i}$ decrease below the desired motor powers, $P_i$. Responsive to $P_1 > P_{TH,1}$ and $P_2 > P_{TH,2}$ at time $t_3$, the controller 12 iteratively calculates $P_{perm,i}$ and $Tq_{perm,i}$ for i=1, 2, as given by equation (6), whereby $Tq_{perm,i}$ is determined as the maximum permitted $i^{th}$ motor torque to have its associated electrical power, $P_{perm,i}$ be as close to but not greater than $P_{TH,i}$ (e.g., $P_{perm,i} \leq P_{TH,i}$) In the example timeline 800, the desired powers and requested torques for the first and second motors are all accelerating values or are all braking values. Thus, responsive to the first condition being satisfied, as shown between time $t_3$ and time $t_4$, the controller 12 proceeds to calculating and balancing the unmet torques at the first and second motors of the axle.

Next, the controller 12 calculates the unmet torques, $Tq_{unmet,1}$ and $Tq_{unmet,2}$, from the differences between $Tq_i$ and $Tq_{perm,i}$ and then calculates the upper unmet torque, $Tq_{unmet,upper}$. After time $t_3$, the yaw moment $Mz_{perm}$ 872 (based on $Tq_{perm,i}$) is substantially different than the original yaw moment 870 (based on the requested torques, $Tq_i$), indicating that at least one of the $Tq_{unmet,i}$ are substantial (e.g., $Tq_{unmet,i} > Tq_{unmet,TH}$) At time $t_4$, responsive to $Tq_{unmet,i} > Tq_{unmet,TH}$ for i=1 and/or 2, the controller 12 continues balancing the unmet torques. In particular, as shown at time $t_4$, responsive to $Tq_1 > Tq_{unmet,upper}$ and $Tq_2 < Tq_{unmet,upper}$ (e.g., the requested motor torque at one one of the motors at the axle being less than the upper unmet torque) the controller 12 partially balances the unmet torques by setting $Tq_{unmet,1} = Tq_{unmet,upper}$, and by setting $Tq_{perm,2} = Tq_{cal}$, according to method 700. As such, the controller 12 reduces the permitted torque at the 1st motor by setting $Tq_{perm,1} = Tq_1 - Tq_{unmet,upper}$ and reduces the permitted torque at the $2^{nd}$ motor by setting $Tq_{perm,2}$ to $Tq_{cal}$. Subsequently, but also shown at time $t_4$ (for clarity), the controller 12 sets $Tq_i = T_{perm,i}$ at each $i^{th}$ motor, and recalculates the corresponding $P_i$ and $w_i$ (i=1, 2) given the new (partially unmet torque-balanced) values of $Tq_i$. As shown in timeline 800, the recalculated values of $P_i$ (810, 820) are less than their respective threshold powers, $P_{TH,i}$ (812, 822), thereby maintaining compliance with the threshold powers, $P_{TH,i}$, at each motor. Concurrently, in partially balancing the unmet torques, the yaw moment $Mz_{bal}$ 874 (arising from the $Tq_i$ after partial unmet torque balancing) at time $t_4$ is higher than $Mz_{perm}$ 872, and $Mz_{bal}$ 874 is much closer to $Mz_{orig}$ 870 relative to $Mz_{perm}$ 872 because the torque differential arising from the $Tq_i$ after partial unmet torque balancing is closer to the torque differential arising from the original requested $Tq_i$ at time $t_3$ relative to the torque differential arising from $Tq_{perm,i}$. At time $t_4$, in the example of timeline 800, motor speeds, $w_i$, are shown to decrease from their values prior to time $t_3$, reflecting the decrease in $Tq_i$, and $P_i$ from their original values at time $t_3$. In other examples, the motor speed may not decrease responsive to a decrease in $Tq_i$ and $P_i$, whereby $Tq_i$ remains positive; rather, only a rate of change in the magnitude of $w_i$ may be reduced, and not the magnitude of $Tq_i$, responsive to a decrease in $Tq_i$ and $P_i$. Furthermore, the direction of $w_i$ may not change responsive to a decrease in $w_i$.

In this way, the methods and systems described herein allow for achieving a technical effect of balancing the torque at the each of the motors positioned an axle while maintaining a yaw moment or reducing a deviation from the intended yaw moment, and while maintaining compliance with the battery power threshold allocatable to each of the motors. Furthermore, the methods and systems apply to when the vehicle is accelerating or decelerating. In particular, each of the motors positioned at the axle are supplied by the controller 12 with propulsive power, torque, and wheel speed at any given time, or each of the motors positioned at the axle are supplied by the controller 12 with braking power, torque, and wheel speed at any given times. Furthermore, each of the motors positioned at the axle may be controlled independently with respect to power, torque, and wheel speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
    coupling two motors to an axle,
    measuring operating conditions of the vehicle, the operating conditions comprising, at each of the two motors, a desired power, a requested torque, and a threshold motor power,
    determining that the desired power is greater than the threshold motor power for at least one of the two motors,
    determining that the requested motor torque at each of the two motors is a propulsive torque or determining that the requested motor torque at each of the two motors is a braking torque, and
    at each of the two motors,
        calculating a permitted motor torque, wherein the permitted motor torque is in compliance with the threshold motor power,
        determining an unmet motor torque as a difference between the requested and the permitted motor torque,
        balancing the unmet motor torque, including reducing the permitted motor torque at one or both of the two motors, and
        after balancing the unmet motor torque, setting the requested motor torque to the permitted motor torque in compliance with the threshold motor power, and applying the requested motor torque.

2. The method of claim 1, wherein at each of the two motors, setting the requested motor torque to the permitted motor torque in compliance with the threshold motor power includes reducing the requested motor torque to the permitted motor torque.

3. The method of claim 2, further comprising determining an upper unmet motor torque, the upper unmet motor torque being a greater of a magnitude of the unmet motor torque at each of the two motors.

4. The method of claim 3, wherein the upper unmet motor torque is less than a magnitude of the requested motor torque at each of the two motors.

5. The method of claim 4, wherein balancing the unmet motor torque includes reducing the permitted motor torque at one of the two motors whereby the unmet motor torque at each of the two motors is equal.

6. The method of claim 5, further comprising, at each of the two motors, partially balancing the unmet motor torque, including reducing the permitted motor torque at one of the two motors responsive to the upper unmet motor torque being greater than the magnitude of the requested motor torque at the one of the two motors.

7. The method of claim 6, wherein partially balancing the unmet motor torque at each of the two motors includes reducing the permitted motor torque at the one of the two motors whereby a difference between the unmet motor torques at the two motors is reduced.

8. The method of claim 7, wherein partially balancing the unmet motor torque at the two motors includes reducing the permitted motor torque at the one of the two motors to a threshold calibration torque.

9. A vehicle system, comprising:
    a first motor and a second motor coupled to a first axle, and
    a controller, including executable instructions residing in non-transitory memory thereon to,
        responsive to a first condition being satisfied,
            at each of the first motor and the second motor,
                calculate a permitted motor torque, wherein the permitted motor torque is in compliance with a threshold motor power,
                determine an unmet motor torque as a difference between a requested motor torque and the permitted motor torque,
                balance the unmet motor torque, including reducing the permitted motor torque at one of the first motor and the second motor, and
                after balancing the unmet motor torque, set the requested motor torque to the permitted motor torque, and apply the requested motor torque at each respective motor.

10. The vehicle system of claim 9, wherein the first condition being satisfied includes, at one or both of the first motor and the second motor, a desired motor power being greater than the threshold motor power.

11. The vehicle system of claim 10, further comprising a battery, wherein the executable instructions further include, allocating a permitted motor power from the battery to the first motor and the second motor, wherein at each of the first motor and the second motor, the permitted motor power corresponds to the permitted motor torque.

12. The vehicle system of claim 9, wherein at each of the first motor and the second motor, balancing the unmet motor torque is performed responsive to when the unmet torque is greater than a threshold unmet torque.

13. The vehicle system of claim 9, wherein the executable instructions to balance the unmet motor torque includes reducing the permitted motor torque at one of the first motor and the second motor whereby a yaw moment deviation, arising from setting the requested motor torque to the permitted motor torque at each of the first motor and the second motor, is reduced.

14. The vehicle system of claim 13, wherein the yaw moment deviation is calculated from a difference between a requested torque differential across the first motor and the second motor and a permitted torque differential across the first motor and the second motor.

15. The vehicle system of claim 9, further comprising a first wheel and a second wheel coupled at opposite ends of the first axle, wherein the first motor drives the first wheel and the second motor drives the second wheel.

16. The vehicle system of claim 9, wherein the first condition being satisfied includes the requested motor torques at both of the first and second motors including propulsive torques or the requested motor torques at both of the first and second motors including braking torques.

17. A method for a vehicle, comprising:
coupling first and second motors to a first axle,
determining that a first condition is satisfied, wherein determining that the first condition is satisfied comprises determining that a desired motor power at one or both of the first and second motors exceeds a threshold motor power, and
responsive to the first condition being satisfied,
at each of the first and second motors,
calculating a permitted motor torque, wherein the permitted motor torque is in compliance with a threshold motor power,
determining an unmet motor torque as a difference between a requested motor torque and the permitted motor torque,
reducing a yaw moment deviation by reducing a magnitude of the permitted motor torque at one of the first and second motors, and
setting the requested motor torque to the permitted motor torque, and applying the requested motor torque at each of the respective motors.

18. The method of claim 17, wherein determining that the first condition is satisfied further comprises determining that the requested motor torques at each of the first and second motors comprise propulsive torques or the requested motor torques at each of the first and second motors comprise braking torques.

19. The method of claim 17, wherein at each of the first and second motors, the permitted motor torque corresponds to a motor torque provided by a permitted motor power, the permitted motor power being less than or equal to the threshold motor power.

20. The method of claim 17, wherein the yaw moment deviation is calculated from a difference between a yaw moment contribution at the first axle arising from a requested torque differential across the first and second motors and a yaw moment contribution at the first axle arising from a permitted torque differential across the first and second motors.

* * * * *